US012771841B2

(12) United States Patent
Koo et al.

(10) Patent No.: US 12,771,841 B2
(45) Date of Patent: *Oct. 20, 2026

(54) METHOD AND APPARATUS FOR PROCESSING IMAGE SIGNAL

(71) Applicant: LG ELECTRONICS INC, Seoul (KR)

(72) Inventors: Moonmo Koo, Seoul (KR); Mehdi Salehifar, Seoul (KR); Seunghwan Kim, Seoul (KR); Jaehyun Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 56 days.

This patent is subject to a terminal disclaimer.

(21) Appl. No.: 18/893,718

(22) Filed: Sep. 23, 2024

(65) Prior Publication Data

US 2025/0016321 A1 Jan. 9, 2025

Related U.S. Application Data

(63) Continuation of application No. 18/369,493, filed on Sep. 18, 2023, now Pat. No. 12,132,903, which is a
(Continued)

(51) Int. Cl.
*H04N 19/122* (2014.01)
*H04N 19/167* (2014.01)
(Continued)

(52) U.S. Cl.
CPC ......... *H04N 19/122* (2014.11); *H04N 19/167* (2014.11); *H04N 19/176* (2014.11); *H04N 19/61* (2014.11)

(58) Field of Classification Search
CPC .... H04N 19/11; H04N 19/122; H04N 19/167; H04N 19/176; H04N 19/593; H04N 19/61; H04N 19/625; H04N 19/70
(Continued)

(56) References Cited

U.S. PATENT DOCUMENTS 11,082,694 B2 * 8/2021 Koo ..................... H04N 19/122
11,589,051 B2 * 2/2023 Koo ..................... H04N 19/122
(Continued)

FOREIGN PATENT DOCUMENTS

CN 101695132 A 4/2010
CN 102474625 A 5/2012
(Continued)

OTHER PUBLICATIONS

Koo et al. "Description of SDR video coding technology proposal by LG Electronics," ITU-T SG 16 WP 3 and ISO/IEC JTC 1/SC 29/WG 11, JVET-J0017-v1, Apr. 2018.
(Continued)

*Primary Examiner* — Kathleen M Walsh
(74) *Attorney, Agent, or Firm* — Bryan Cave Leighton Paisner LLP

(57) ABSTRACT

The embodiments of the present disclosure provides a method and apparatus for video signal processing. A method for decoding an image signal according to an embodiment of the present disclosure may include determining an input length and an output length of a non-separable transform based on a height and a width of a current block; determining a non-separable transform matrix corresponding to the input length and the output length of a non-separable transform; and applying the non-separable transform matrix to coefficients by a number of the input length in the current block, wherein the height and the width of a current block is greater than or equal to 8, wherein, if each of the height and the width of a current block is equal to 8, the input length of the non-separable transform is determined as 8.

3 Claims, 27 Drawing Sheets

Related U.S. Application Data continuation of application No. 18/097,775, filed on Jan. 17, 2023, now Pat. No. 11,818,352, which is a continuation of application No. 17/360,164, filed on Jun. 28, 2021, now Pat. No. 11,589,051, which is a continuation of application No. 16/901,818, filed on Jun. 15, 2020, now Pat. No. 11,082,694, which is a continuation of application No. PCT/KR2019/011517, filed on Sep. 5, 2019.

(60) Provisional application No. 62/727,526, filed on Sep. 5, 2018.

(51) Int. Cl.
*H04N 19/176* (2014.01)
*H04N 19/61* (2014.01)

(58) Field of Classification Search
USPC ..................................................... 375/240.02
See application file for complete search history.

(56) References Cited

U.S. PATENT DOCUMENTS

| | | | | |
|---|---|---|---|---|
| 11,818,352 | B2 * | 11/2023 | Koo | H04N 19/122 |
| 12,132,903 | B2 * | 10/2024 | Koo | H04N 19/122 |
| 2011/0193729 | A1 | 8/2011 | Ashida | |
| 2012/0033731 | A1 | 2/2012 | Tomohiro | |
| 2016/0323583 | A1 | 11/2016 | Muneaki | |
| 2017/0094313 | A1 * | 3/2017 | Zhao | H04N 1/32181 |
| 2018/0220159 | A1 | 8/2018 | Chan-Yul | |
| 2018/0302631 | A1 * | 10/2018 | Chiang | H04N 19/176 |
| 2019/0149822 | A1 * | 5/2019 | Kim | H04N 19/18 375/240.02 |
| 2020/0304782 | A1 | 9/2020 | Zhao et al. | |

FOREIGN PATENT DOCUMENTS

| | | | |
|---|---|---|---|
| CN | 103370939 | A | 10/2013 |
| CN | 104067622 | A | 9/2014 |
| CN | 104685872 | A | 6/2015 |
| CN | 105120272 | A | 12/2015 |
| CN | 108141596 | A | 6/2018 |
| CN | 108322743 | A | 7/2018 |
| CN | 108322745 | A | 7/2018 |
| EP | 3300366 | A1 | 3/2018 |
| KR | 1020150011787 | A | 2/2015 |
| KR | 1020170142870 | A | 12/2017 |
| KR | 1020180098159 | A | 9/2018 |
| WO | 2018135885 | A1 | 7/2018 |

OTHER PUBLICATIONS

Kaiyuan Jia, et al., “Mode-Dependent Transforms Based on Elliptical Model for High Efficiency Video Coding”, 2016, Nov. 27 - 30, 2016.

Kaiyuan Jia, “Study of Advanced Transforms in HEVC/H.265”, A Master Thesis Submitted to University of Electronic Science and Technology of China. 1-63.

Borut Žalik, et al., “Chain code lossless compression using move-to-front transform and adaptive run-length encoding”, Signal Processing: Image Communication 29 (2014) 96-106.

Mu Fangshun, et al., “Research on Fast Inter Mode Decision in HEVC”, Dissertation Submitted to Shanghai Jiao Tong University for the Degree of Master.

Xin Zhao, et al., “Non-Separable Secondary Transforms for Next Generation Video Coding”.

* cited by examiner

[FIG. 1]
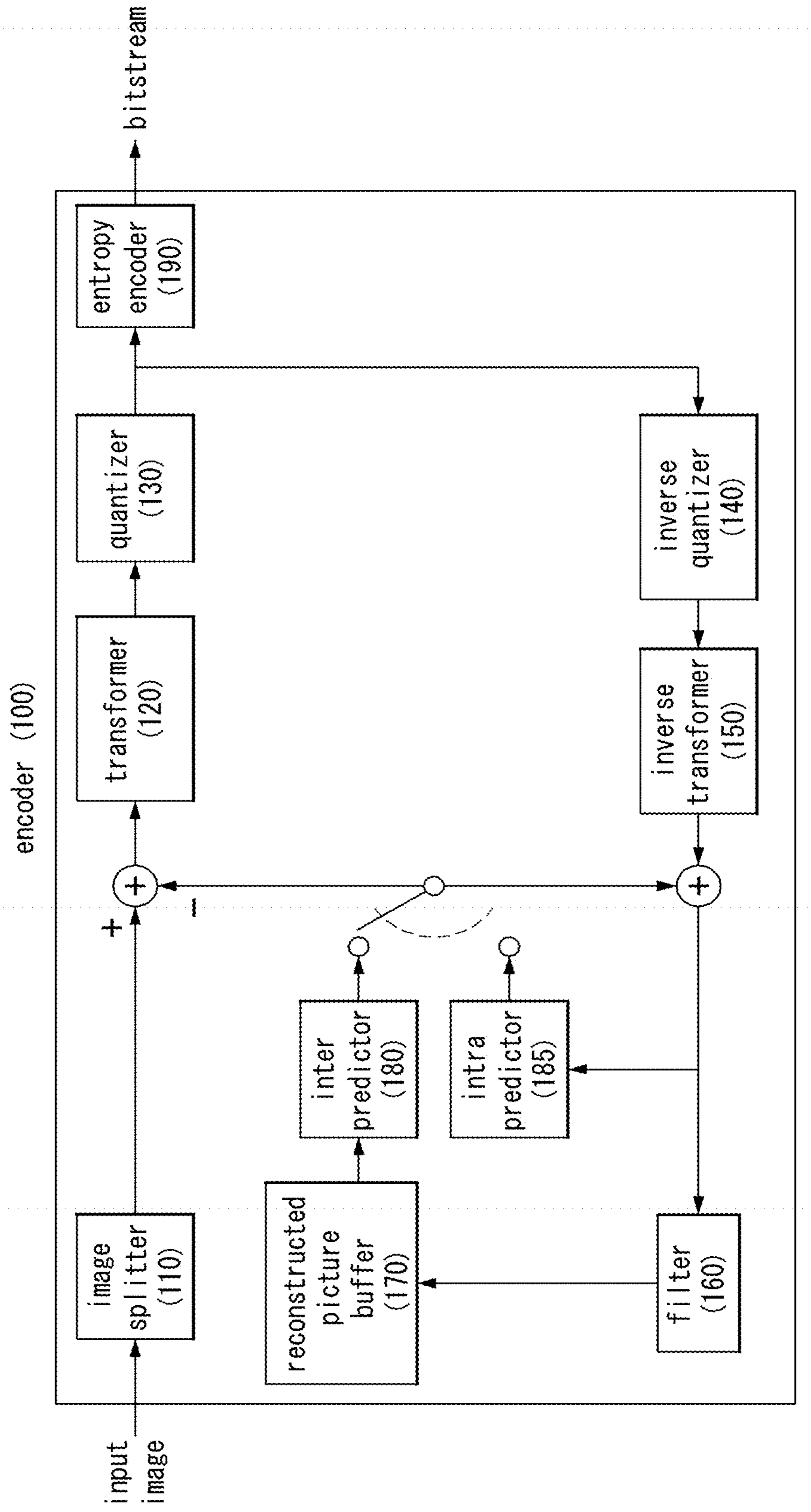

[FIG. 2]
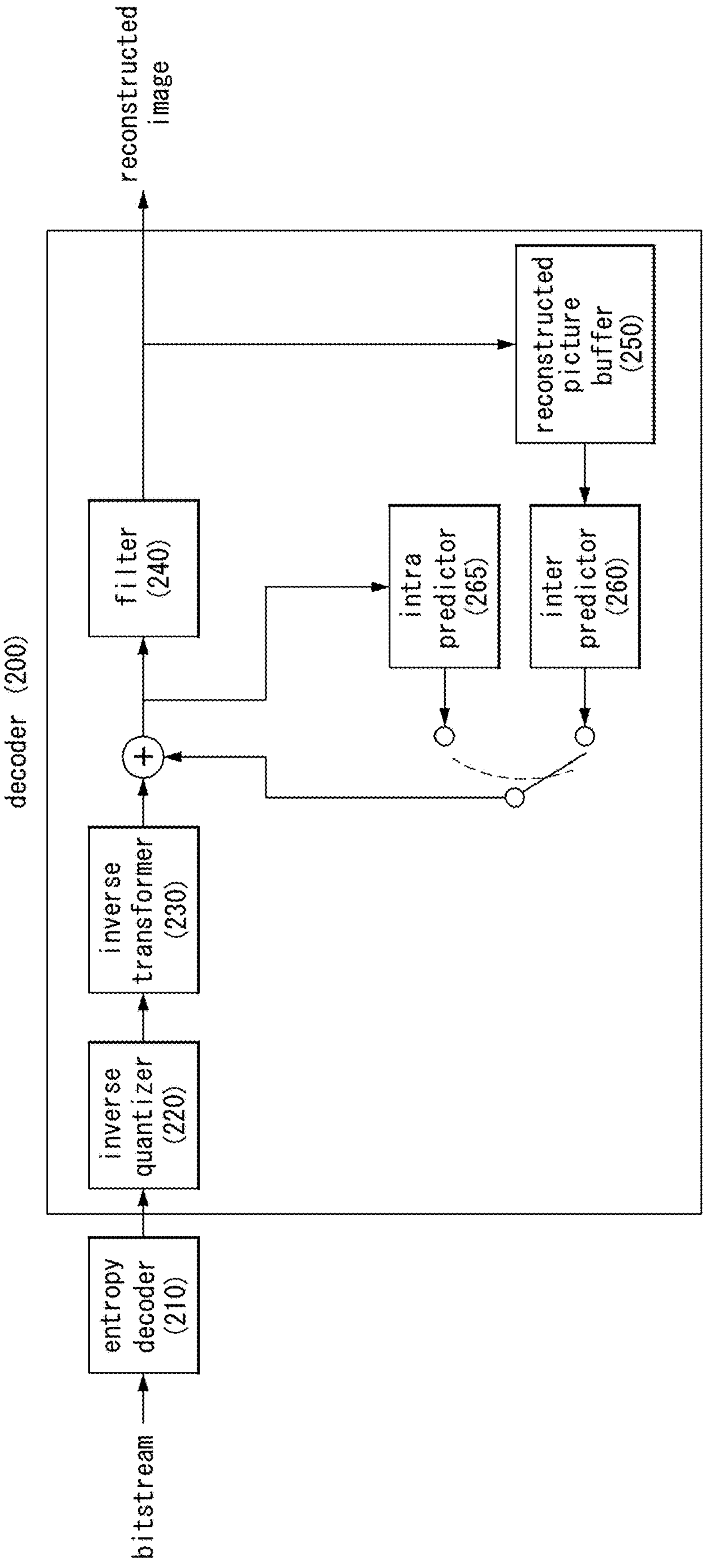

【FIG. 3A】
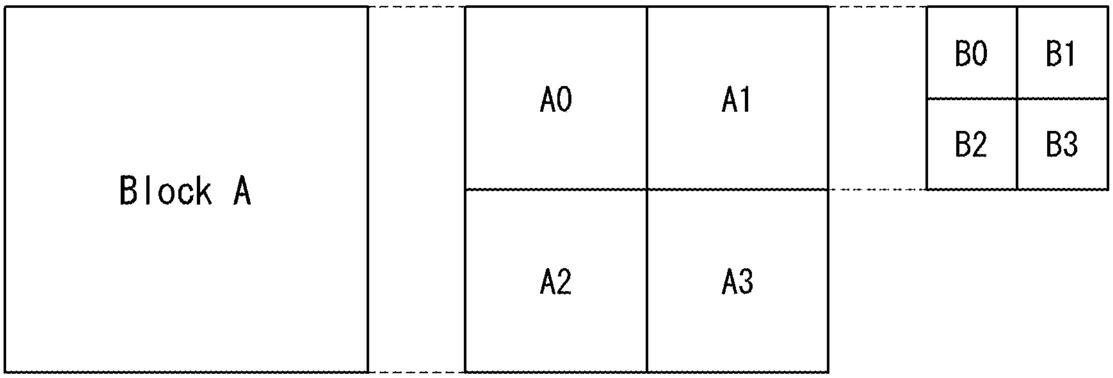
【FIG. 3B】
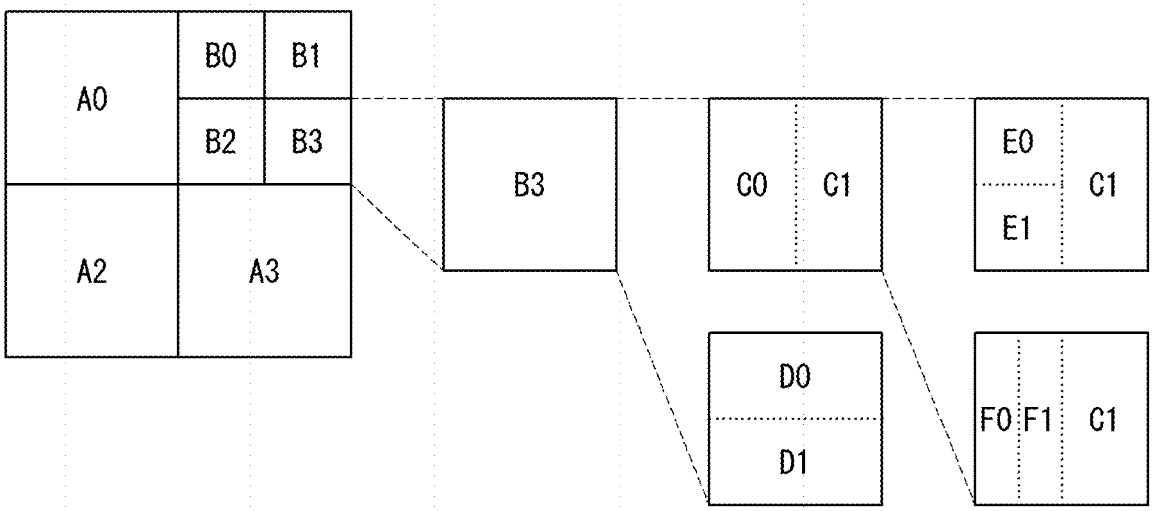

【FIG. 3C】
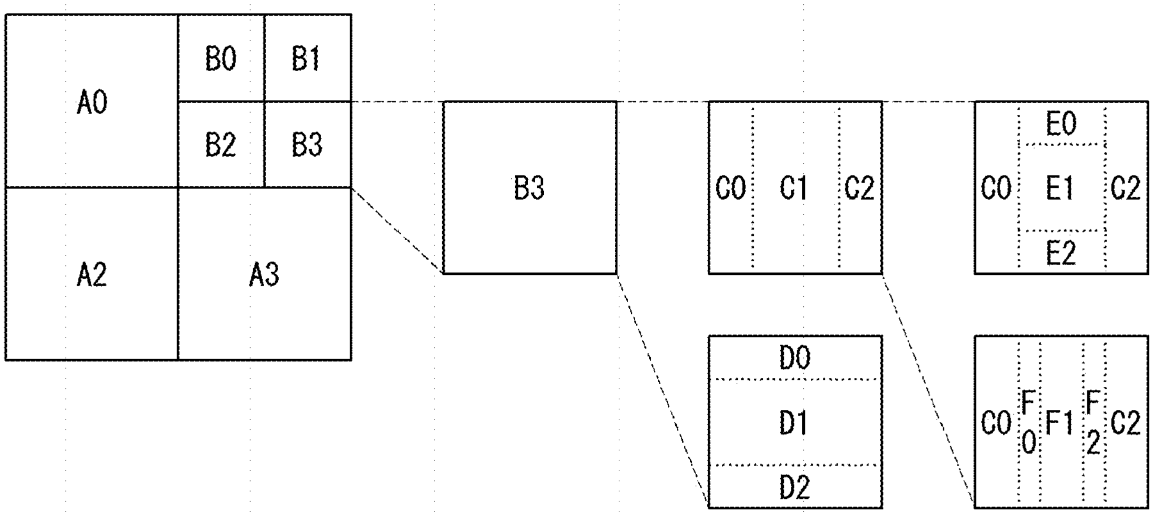
【FIG. 3D】
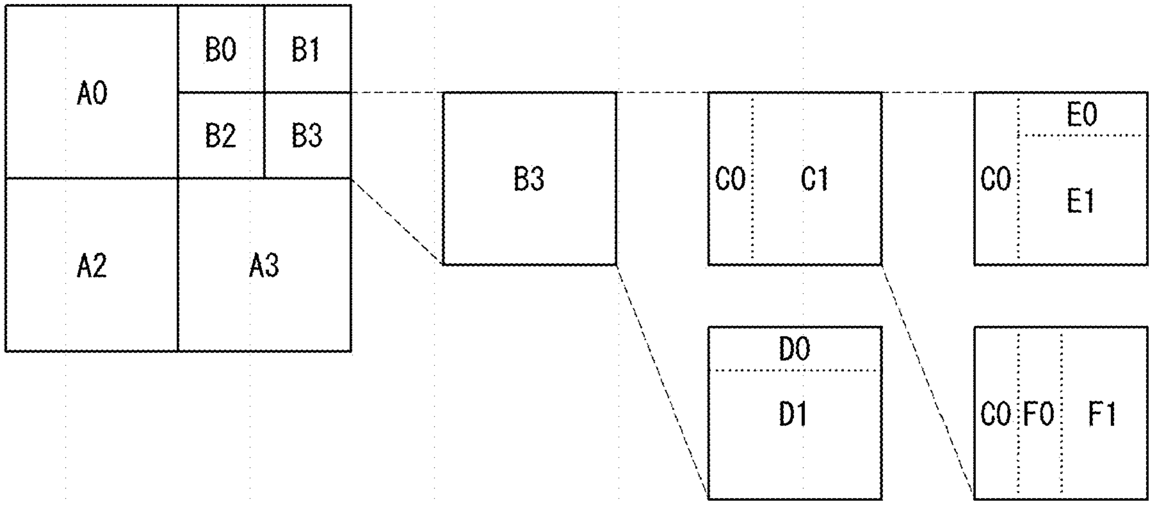

[FIG. 4]
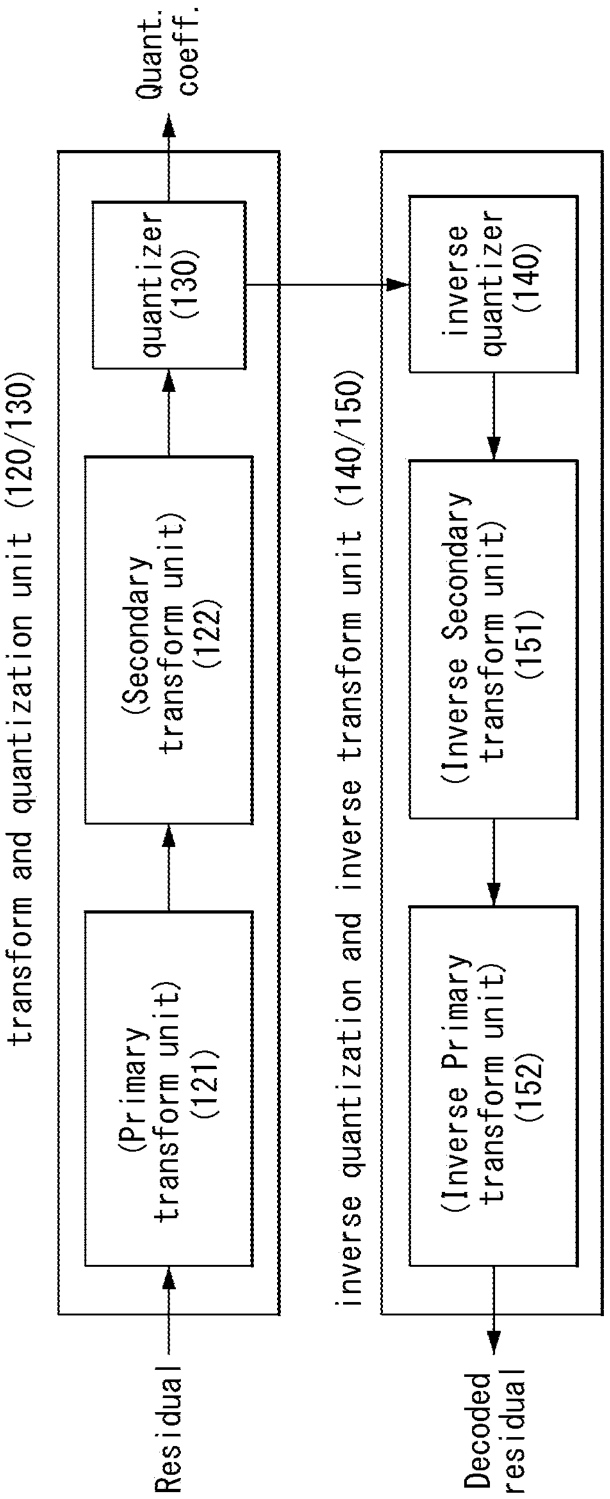

[FIG. 5]
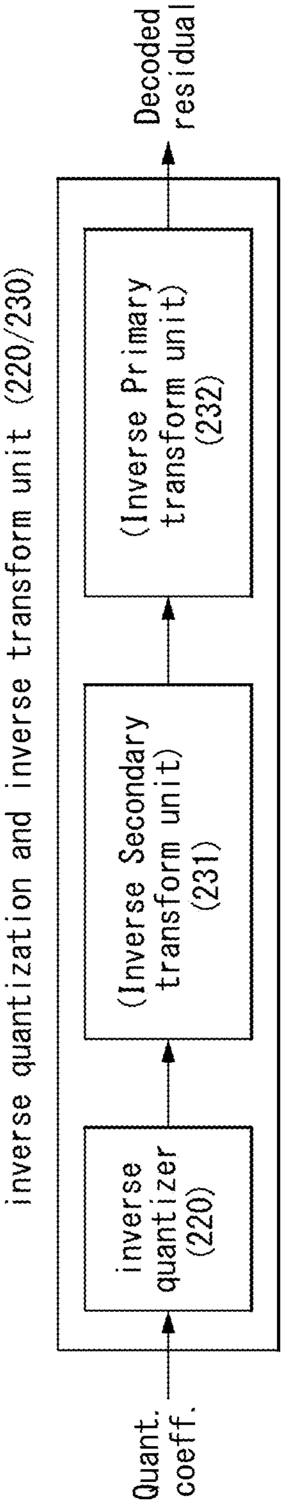

【FIG. 6】
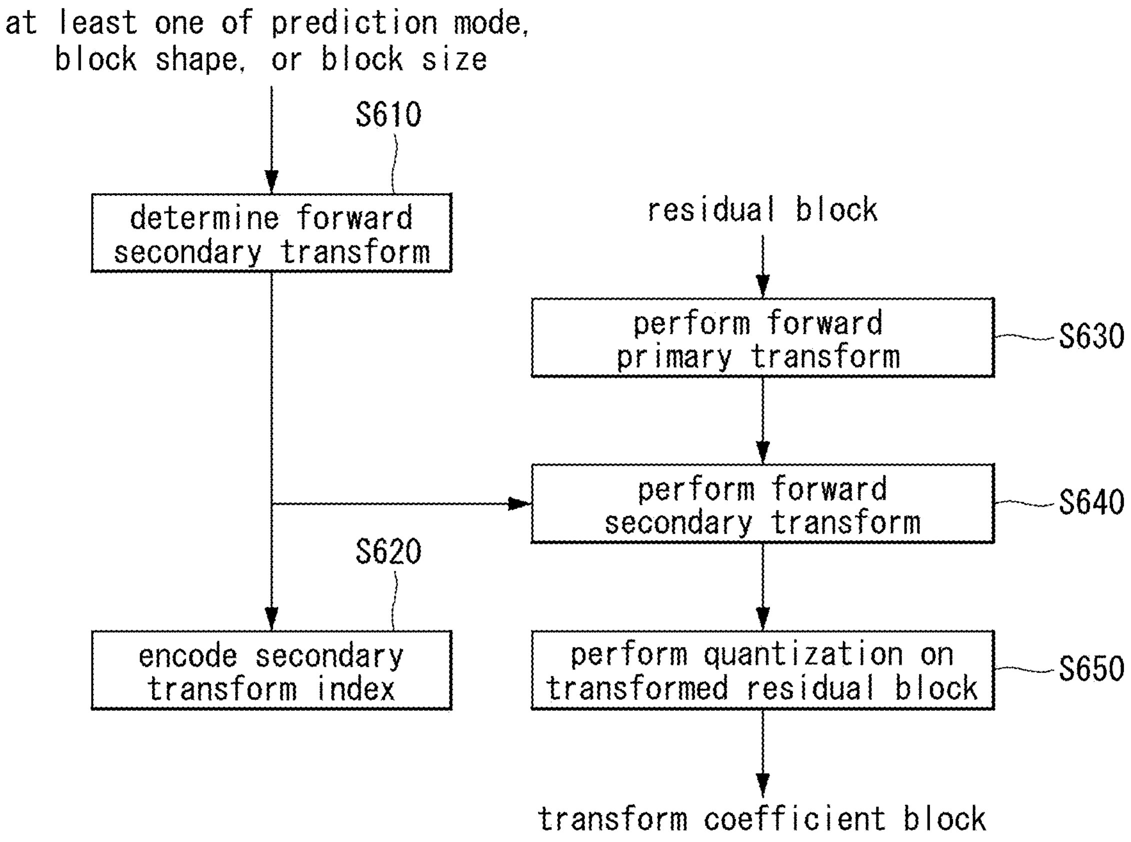

【FIG. 7】
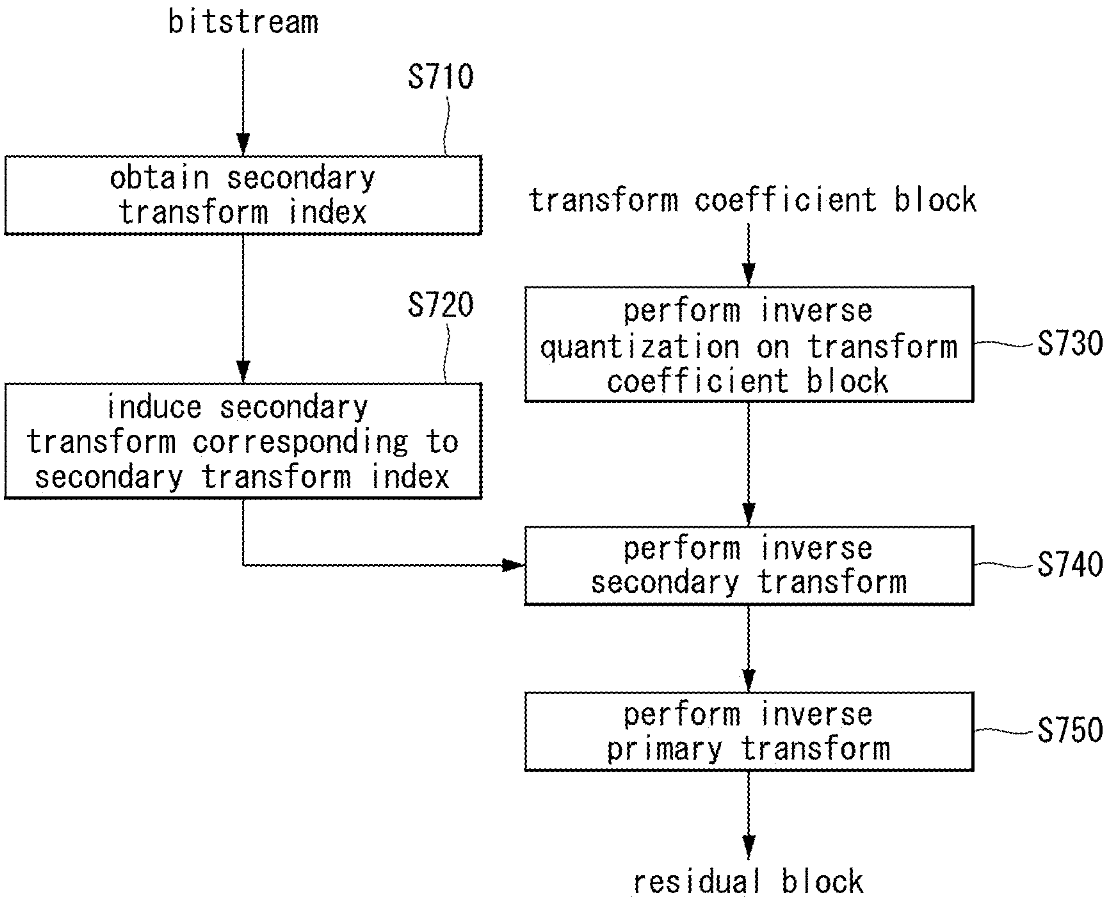

[FIG. 8]

| Configuration group | | Horizontal (rcw) transform | Vertical (column) transform | 35 intra prediction modes | 67 intra prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21 23, 29, 31, 33 | 1, 3, 5, 7, 9, 13, 15, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Noighboring angles to horizontal directions) | 14, 15, 16, 17, 18, 19, 20, 21, 22 (Noighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Noighboring angles to vertical directions) | 46, 47, 48, 49, 50, 51, 52, 53, 54 (Noighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

【FIG. 9】
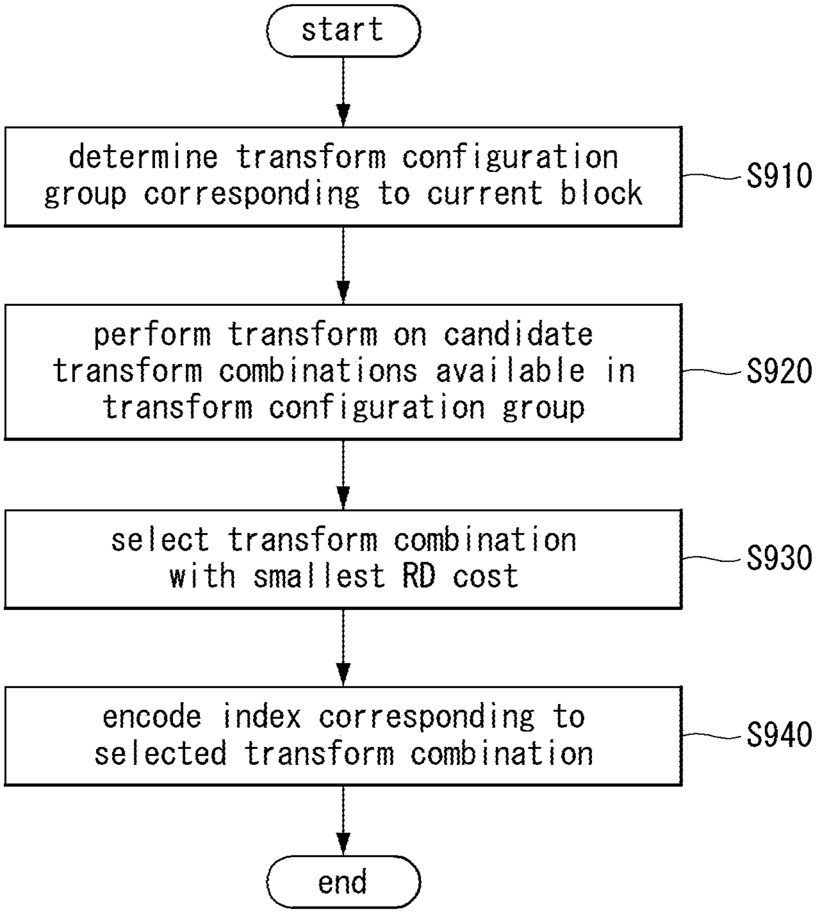

[FIG. 10]
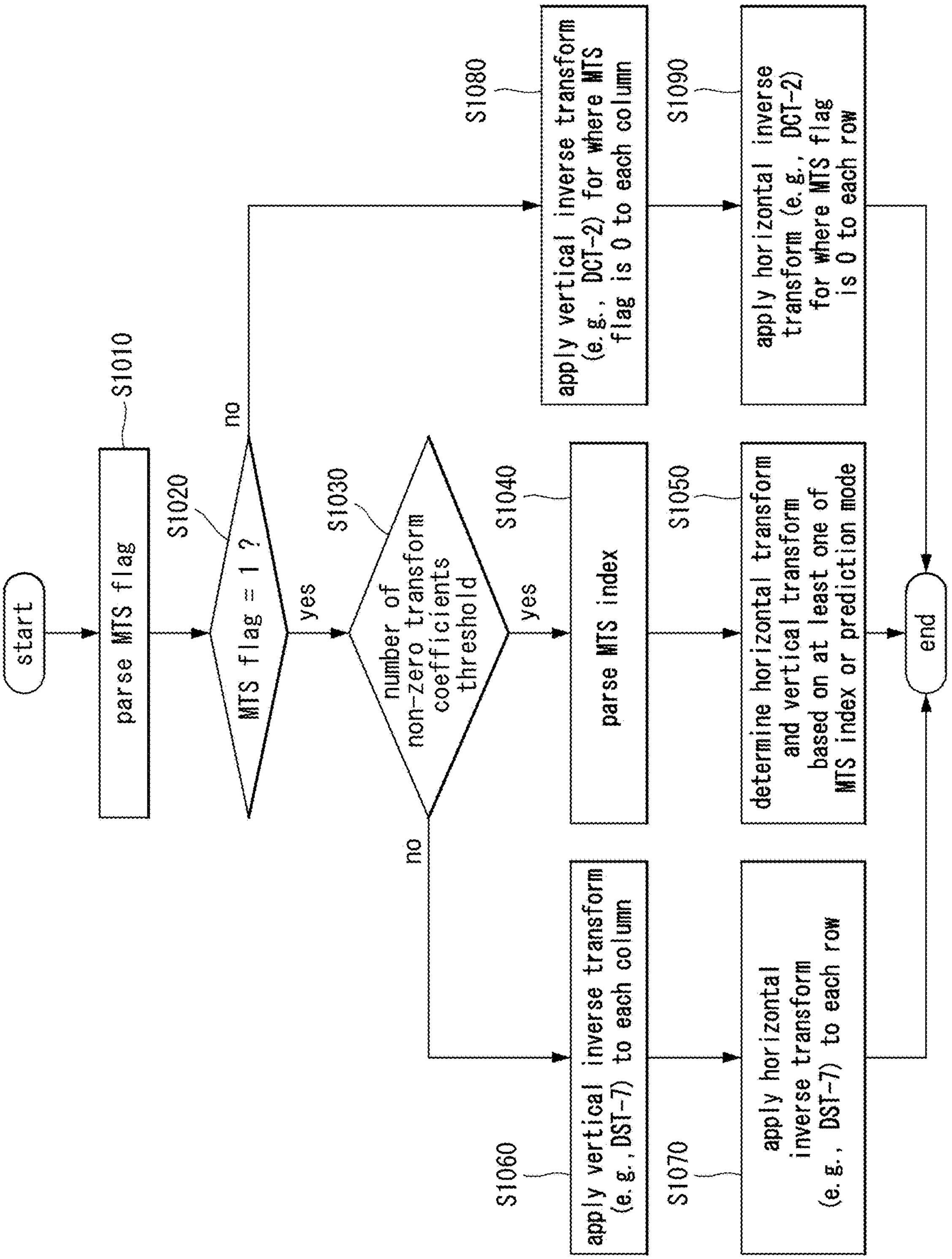

【FIG. 11】
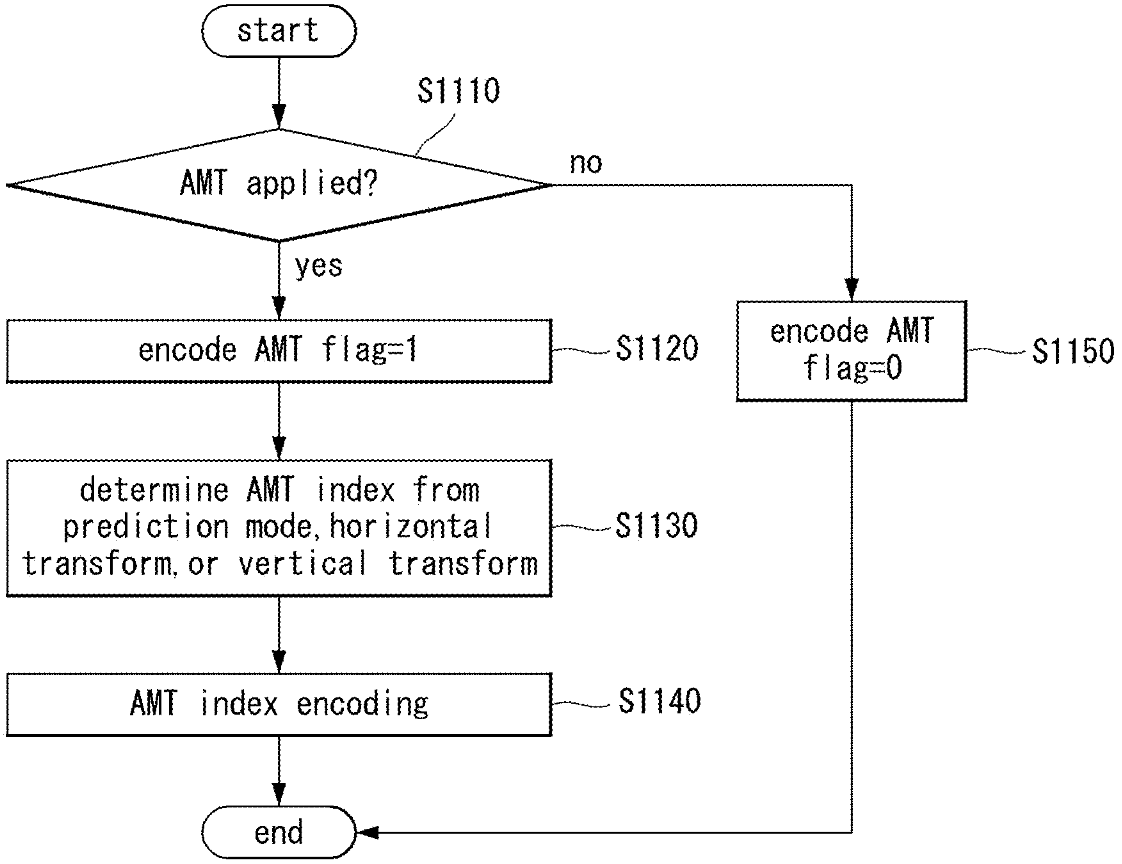

【FIG. 12】
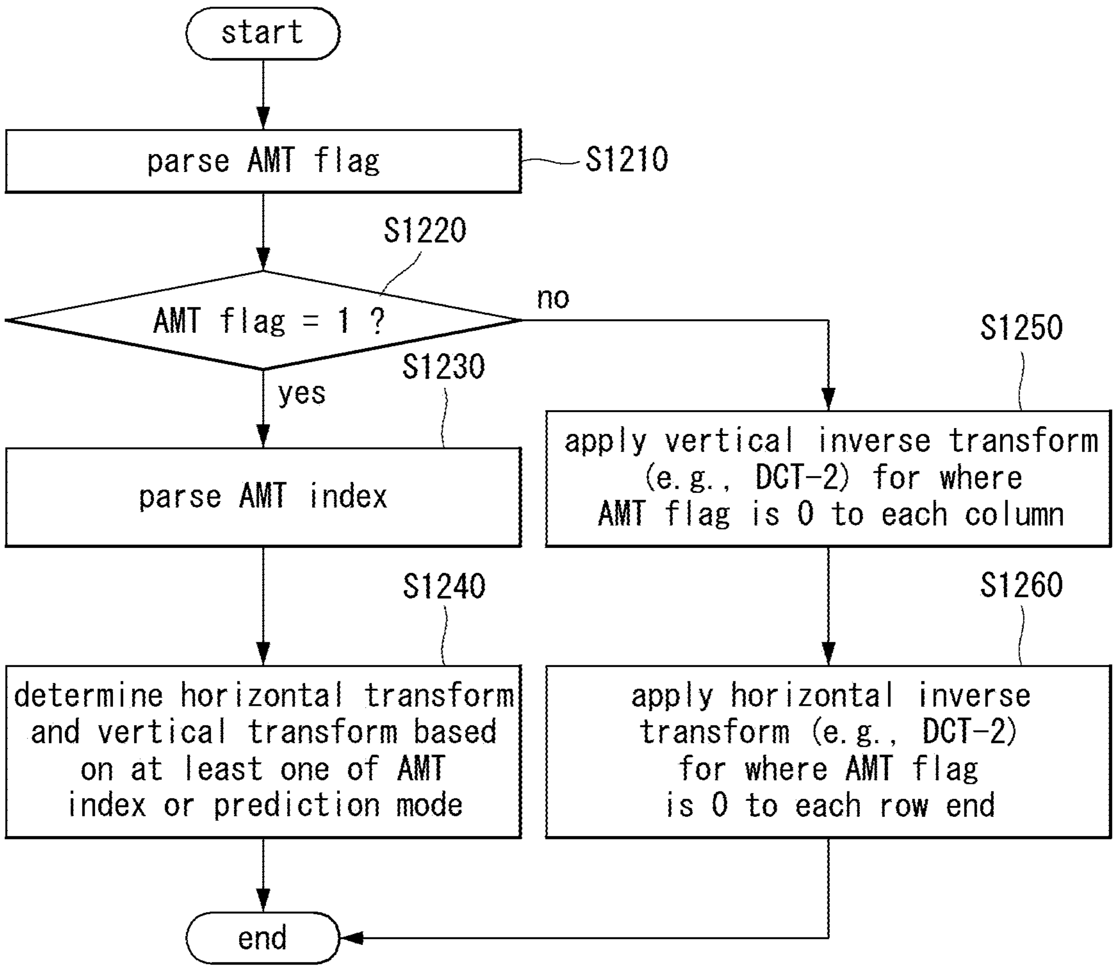
【FIG. 13】
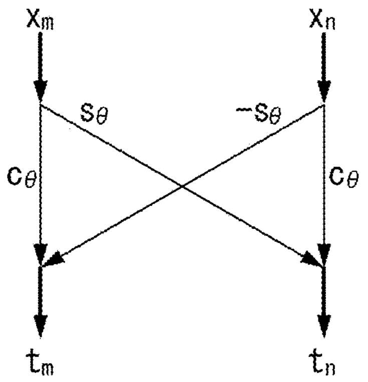

【FIG. 14】
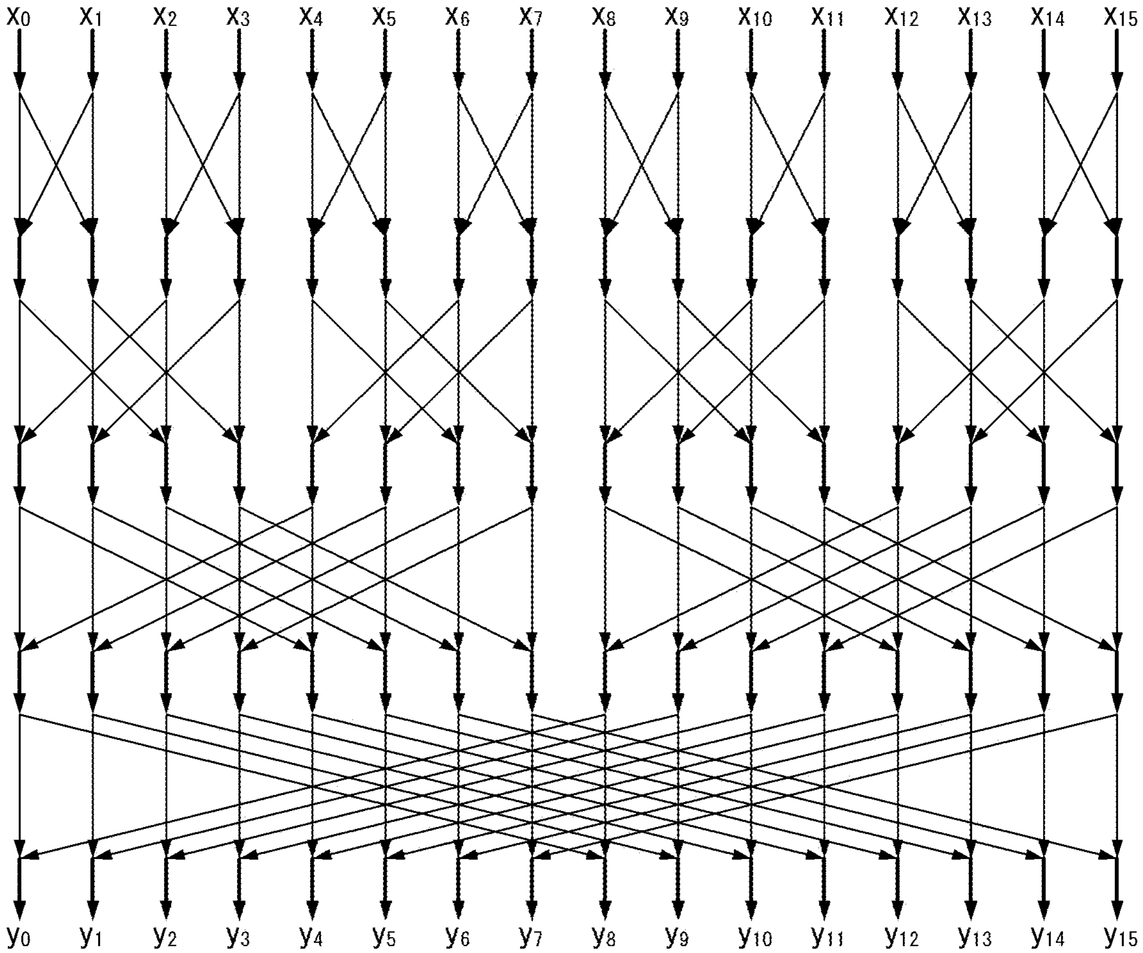
【FIG. 15】
| | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|
| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |

【FIG. 16】
| | | | |
|---|---|---|---|
| 1 | 3 | 6 | 10 |
| 2 | 5 | 9 | 13 |
| 4 | 8 | 12 | 15 |
| 7 | 11 | 14 | 16 |
(a)
| | | | |
|---|---|---|---|
| 1 | 2 | 3 | 4 |
| 5 | 6 | 7 | 8 |
| 9 | 10 | 11 | 12 |
| 13 | 14 | 15 | 16 |
(b)
| | | | |
|---|---|---|---|
| 1 | 5 | 9 | 13 |
| 2 | 6 | 10 | 14 |
| 3 | 7 | 11 | 15 |
| 4 | 8 | 12 | 16 |
(c)
【FIG. 17】
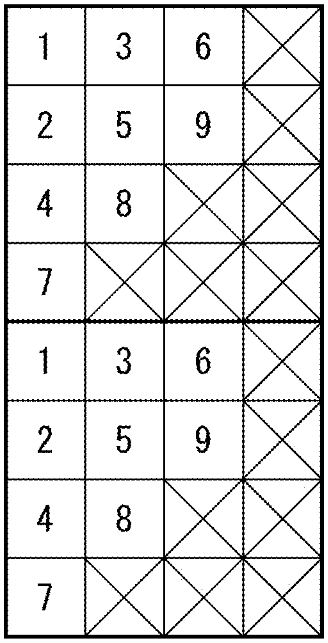

【FIG. 18】
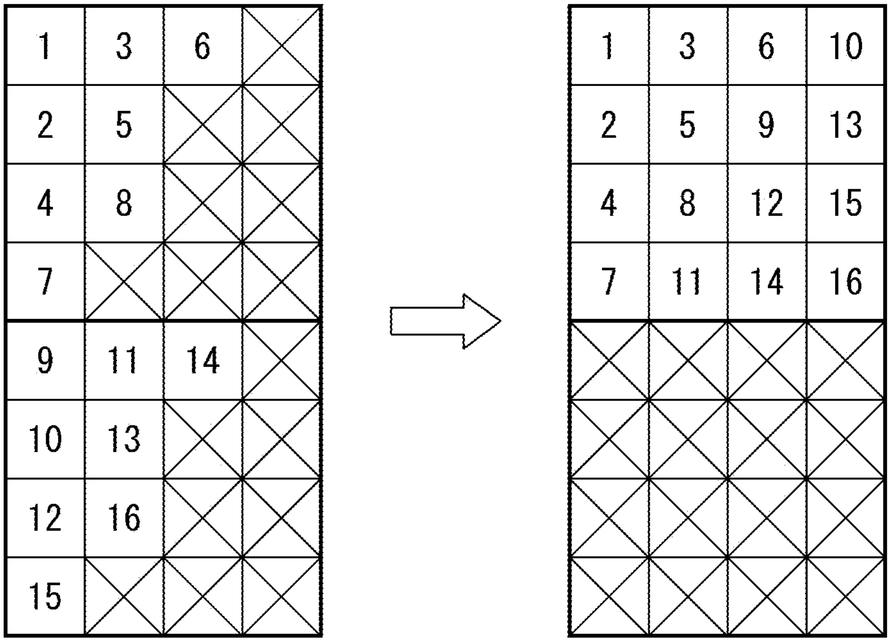
(a) (b)

[FIG. 19]

| | | | | | | | | | | | | | | | | | |
|---|---|---|---|---|---|---|---|---|---|---|---|---|---|---|---|---|---|
| Intra Mode | 0 | 1 | 2 | 3 | 4 | 5 | 6 | 7 | 8 | 9 | 10 | 11 | 12 | 13 | 14 | 15 | 16 |
| Mixed Type | 1 | 1 | 1 | 1 | 1 | 0 | 0 | 0 | 0 | 0 | 0 | 0 | 0 | 0 | 0 | 0 | 1 |
| Intra Mode | 34 | 35 | 36 | 37 | 38 | 39 | 40 | 41 | 42 | 43 | 44 | 45 | 46 | 47 | 48 | 49 | 50 |
| Intra Mode | 1 | 1 | 1 | 0 | 0 | 0 | 0 | 0 | 0 | 0 | 0 | 0 | 0 | 0 | 1 | 1 | 1 |

| | | | | | | | | | | | | | | | | | |
|---|---|---|---|---|---|---|---|---|---|---|---|---|---|---|---|---|---|
| Intra Mode | 17 | 18 | 19 | 20 | 21 | 22 | 23 | 24 | 25 | 26 | 27 | 28 | 29 | 30 | 31 | 32 | 33 |
| Mixed Type | 1 | 1 | 1 | 1 | 0 | 0 | 0 | 0 | 0 | 0 | 0 | 0 | 0 | 0 | 0 | 1 | 1 |
| Intra Mode | 51 | 52 | 53 | 54 | 55 | 56 | 57 | 58 | 59 | 60 | 61 | 62 | 63 | 64 | 65 | 66 | 67 |
| Intra Mode | 1 | 1 | 0 | 0 | 0 | 0 | 0 | 0 | 0 | 0 | 0 | 0 | 0 | 0 | 0 | 1 | 0 |

【FIG. 20】
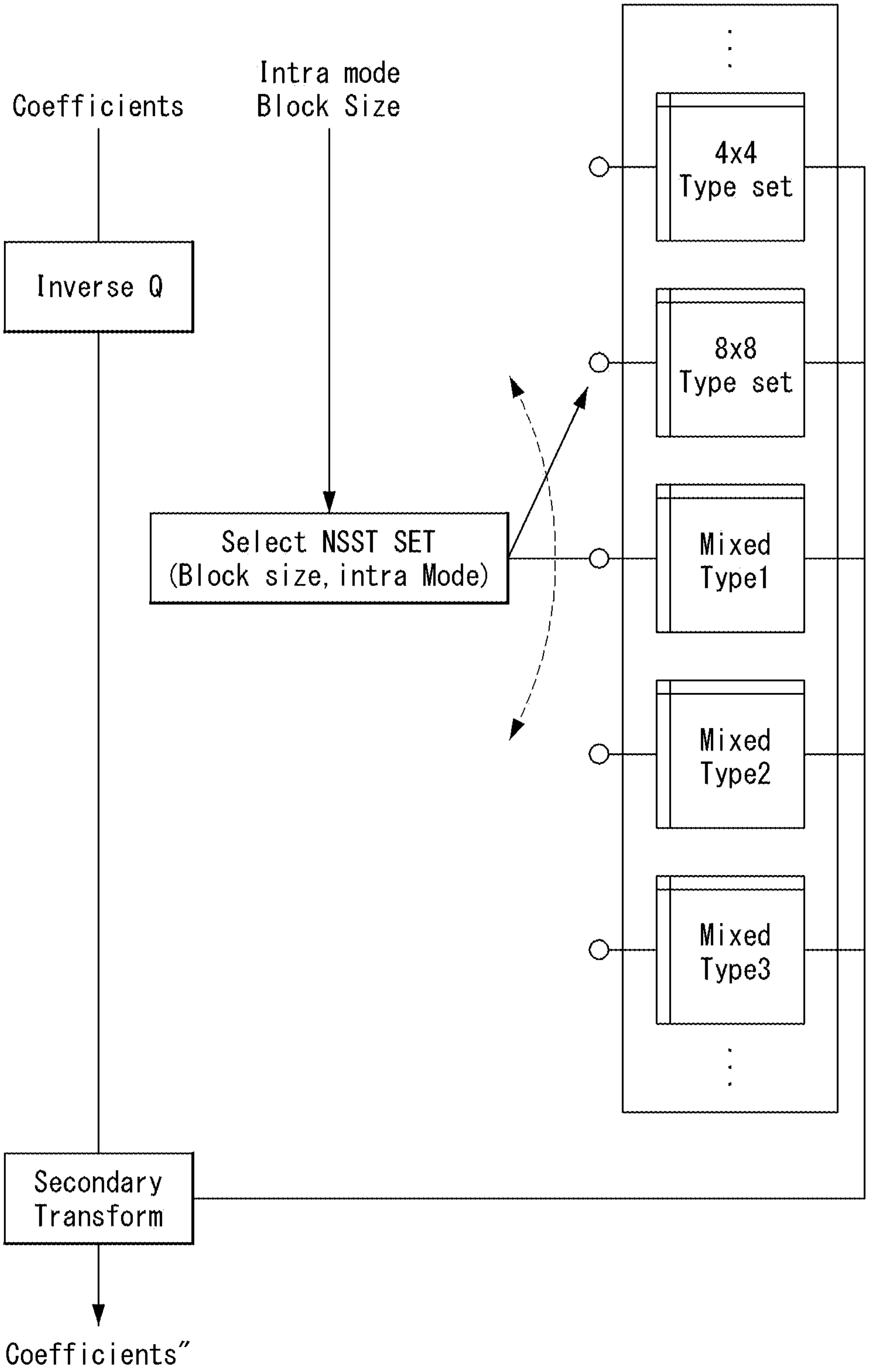

【FIG. 21A】
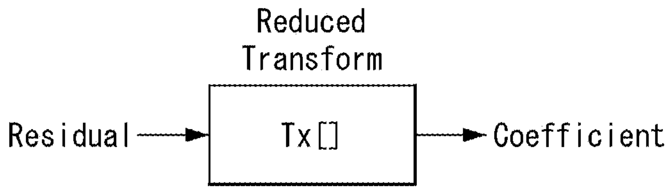
【FIG. 21B】
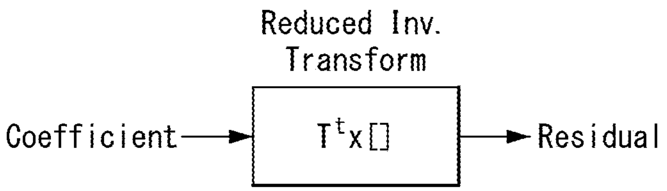
【FIG. 22】
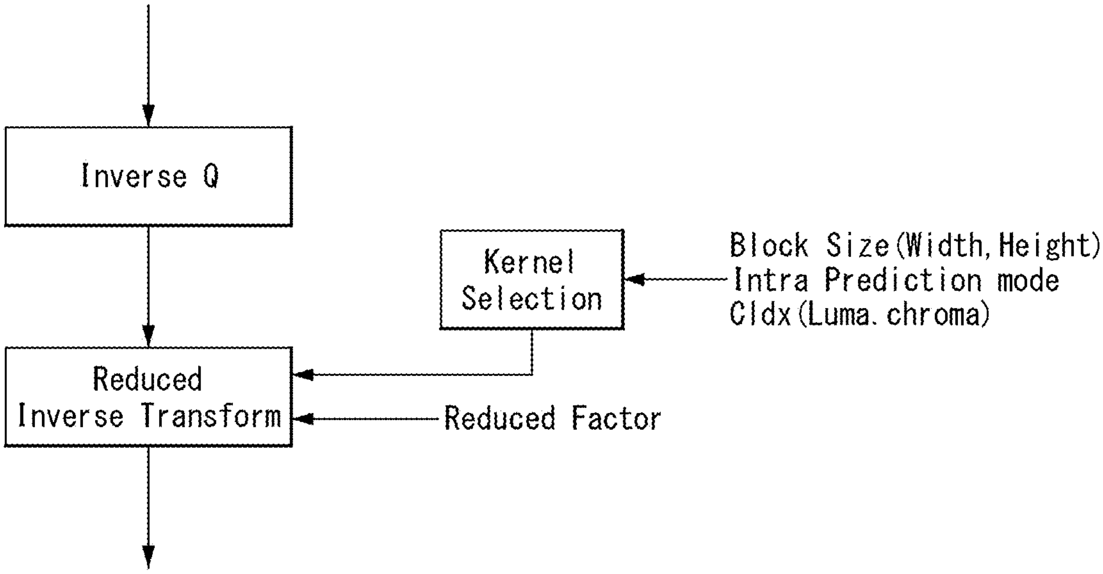

【FIG. 23】
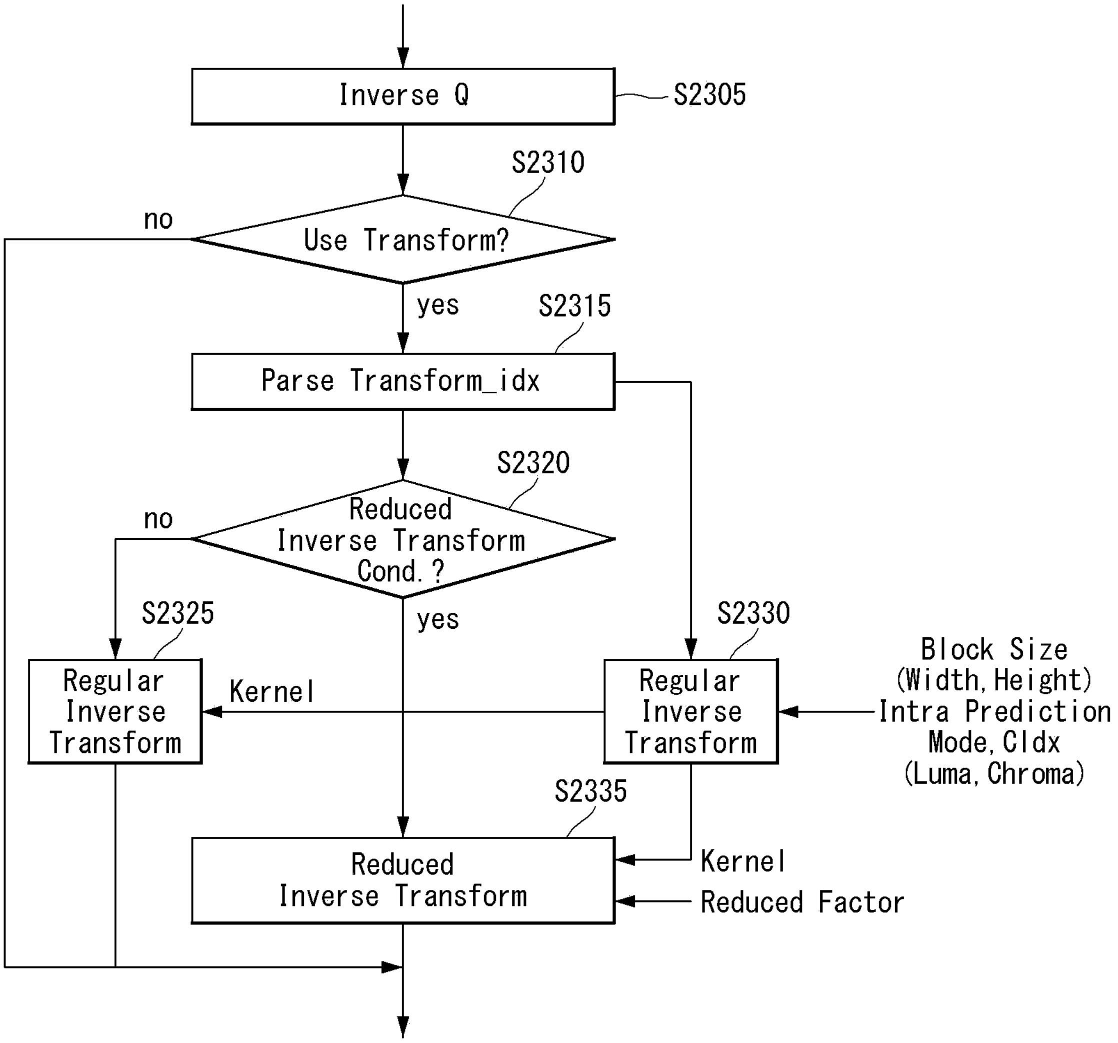

【FIG. 24】
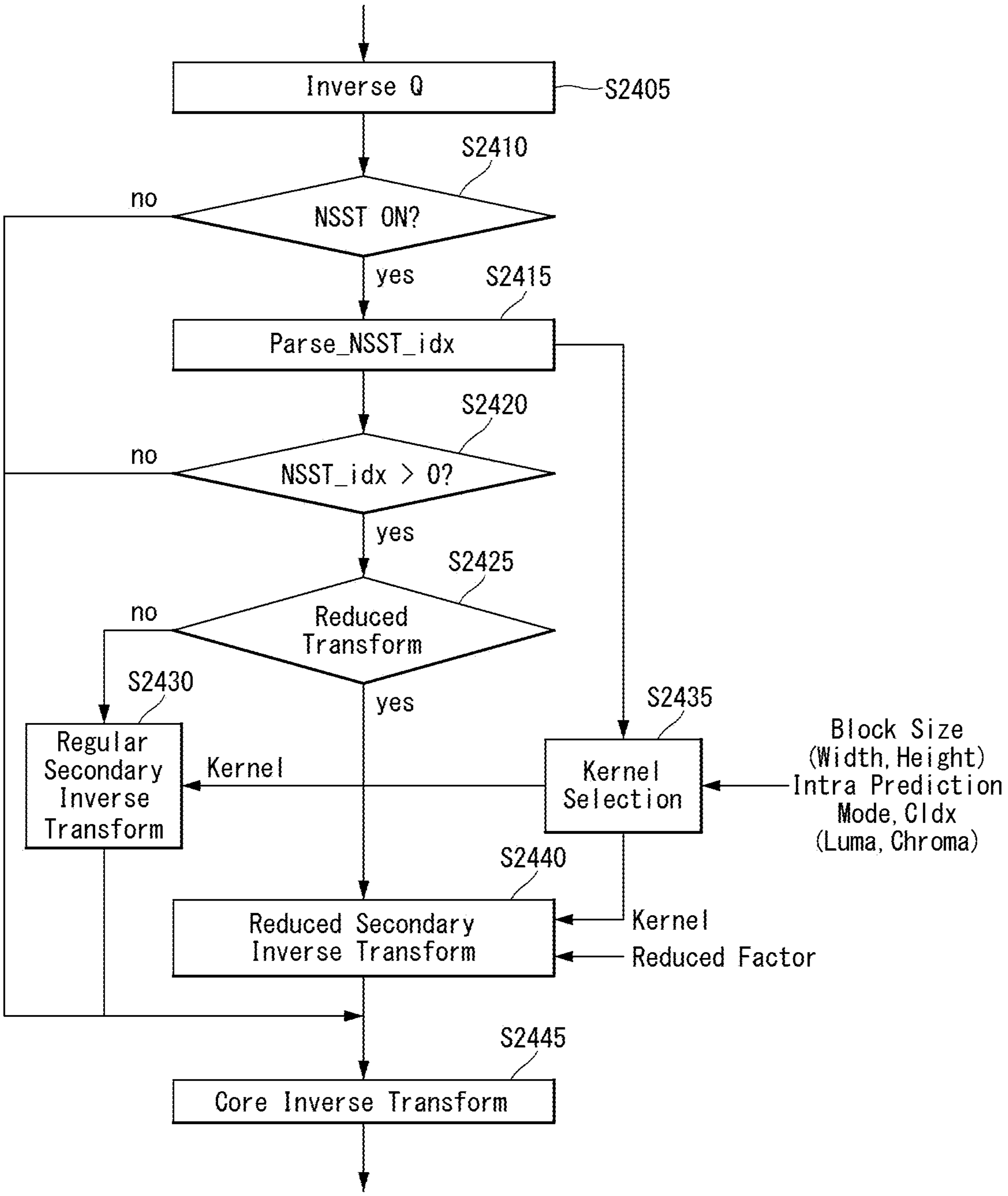

【FIG. 25A】

$$\begin{bmatrix} t_{1,1} & t_{1,2} & \cdots & t_{1,64} \\ t_{2,1} & t_{2,2} & & t_{2,64} \\ & \vdots & \ddots & \vdots \\ t_{16,1} & t_{16,2} & & t_{16,64} \end{bmatrix} \times \begin{bmatrix} r_1 \\ r_2 \\ \vdots \\ \vdots \\ \vdots \\ r_{64} \end{bmatrix}$$

【FIG. 25B】

$$\begin{bmatrix} t_{1,1} & t_{2,1} & \cdots & t_{16,1} \\ t_{1,2} & t_{2,2} & & t_{16,2} \\ t_{1,3} & t_{2,3} & & t_{16,3} \\ & \vdots & \ddots & \vdots \\ t_{1,64} & t_{2,64} & & t_{16,64} \end{bmatrix} \times \begin{bmatrix} c_1 \\ c_{11} \\ \vdots \\ c_{16} \end{bmatrix}$$

【FIG. 26A】

```
for i from 1 to R:
    c_i = 0
    for j from 1 to N:
        c_i += t_i,j * r_j
```

【FIG. 26B】

```
for i from 1 to N:
    r_j = 0
    for j from 1 to R:
        r_j += t_j,i * c_j
```

【FIG. 27】
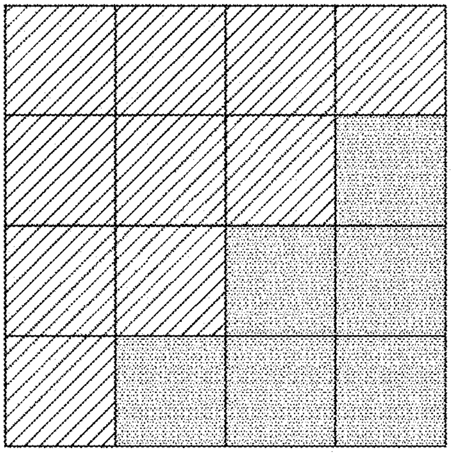
【FIG. 28】
【FIG. 29】
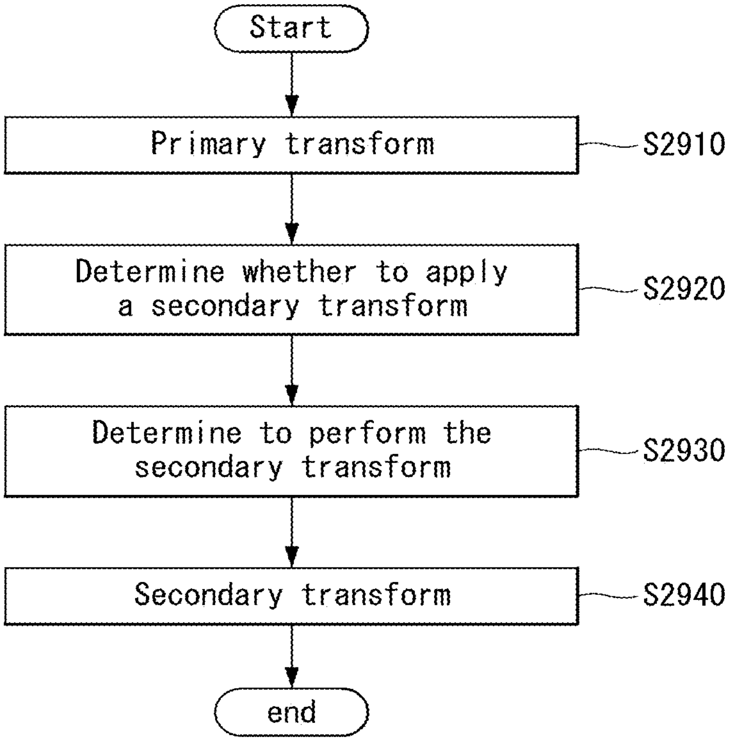

【FIG. 30】
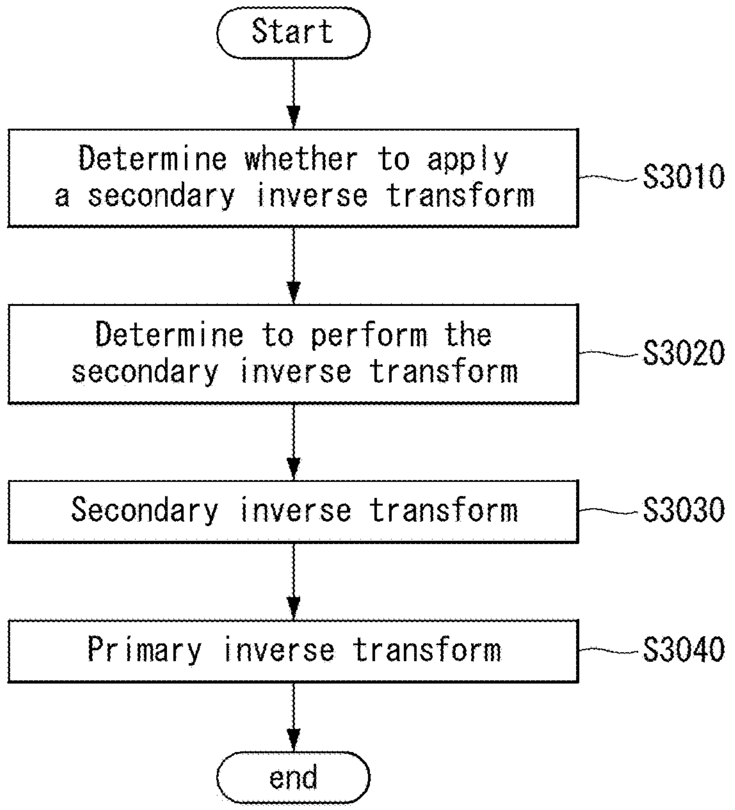
【FIG. 31】
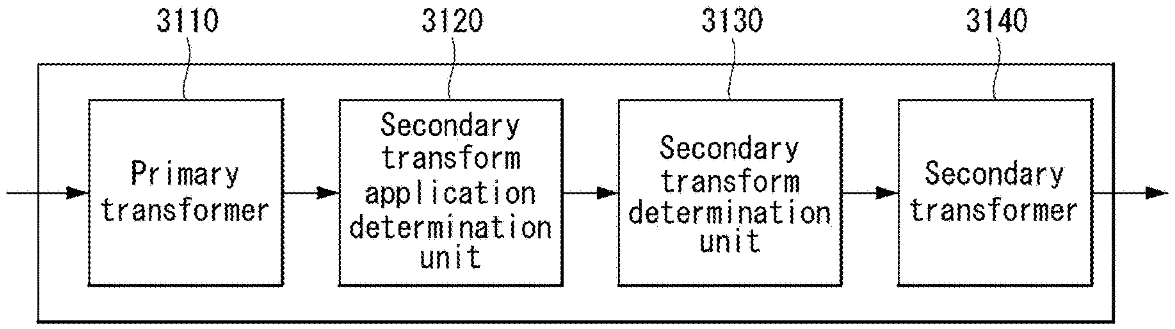

【FIG. 32】
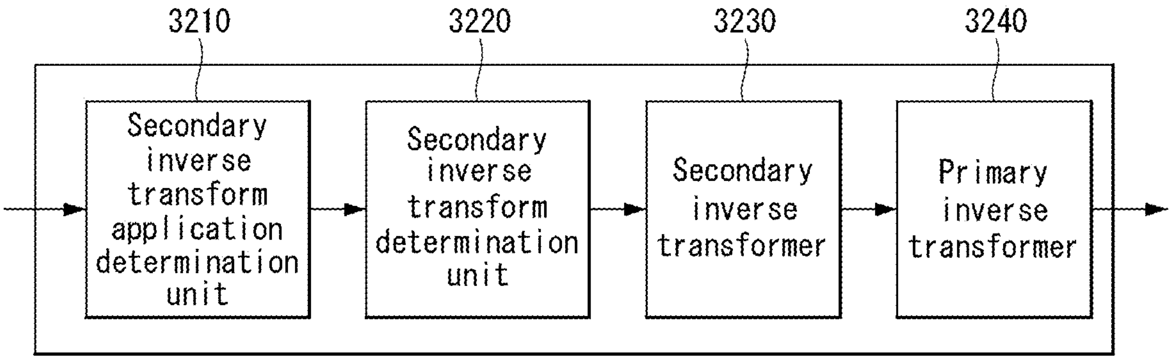
【FIG. 33】
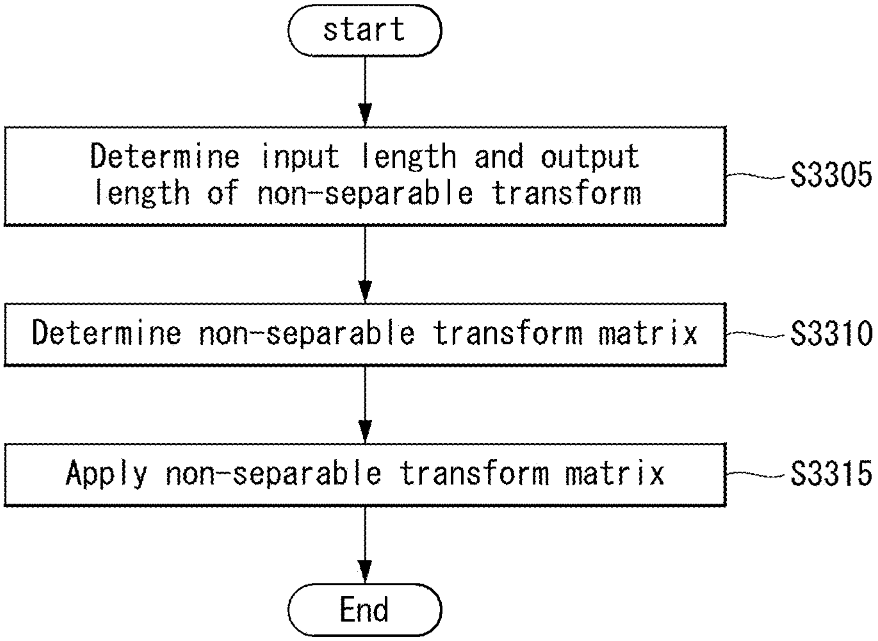

【FIG. 34】
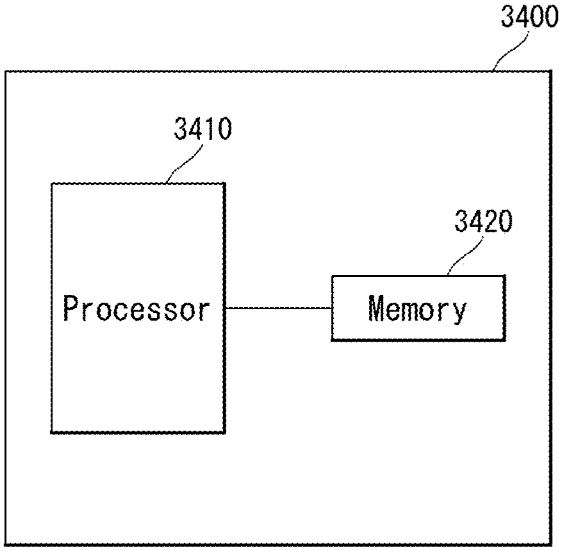
【FIG. 35】
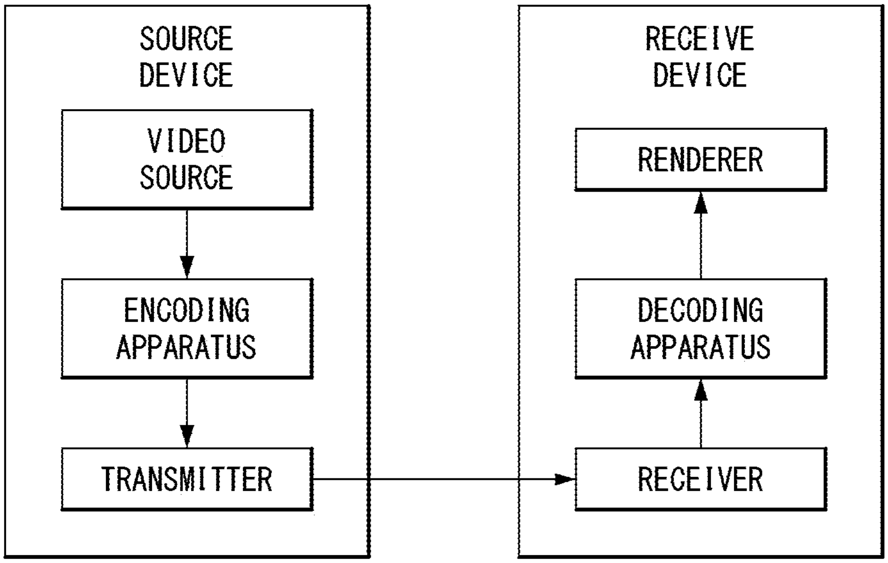

【FIG. 36】
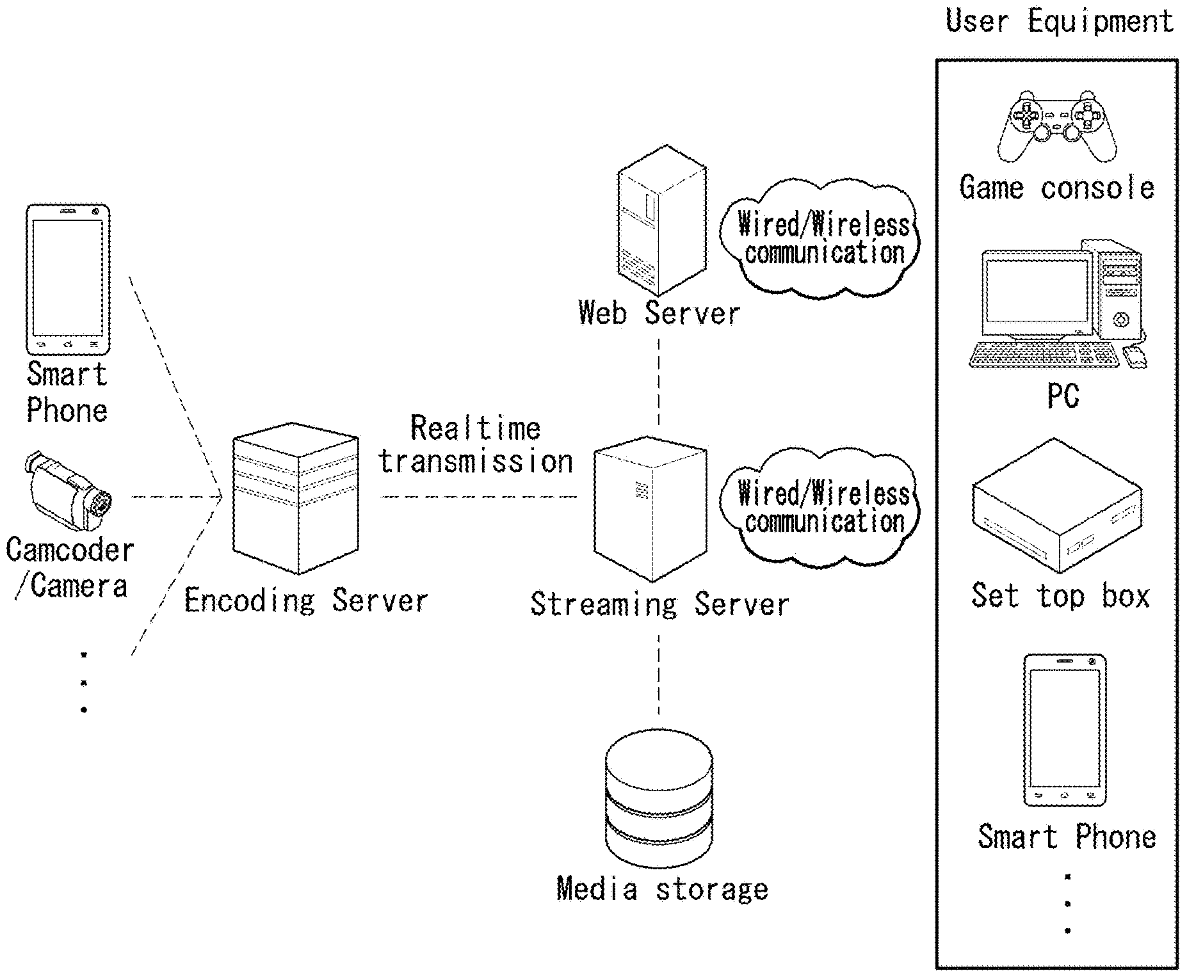

METHOD AND APPARATUS FOR PROCESSING IMAGE SIGNAL

CROSS-REFERENCE TO RELATED APPLICATIONS

This application is a continuation application of U.S. patent application Ser. No. 18/369,493, filed Sep. 18, 2023, which is a continuation application of U.S. patent application Ser. No. 18/097,775, filed on Jan. 17, 2023, which is a continuation of U.S. patent application Ser. No. 17/360,164, filed on Jun. 28, 2021 (now U.S. Pat. No. 11,589,051, issued on Feb. 21, 2023), which is continuation of U.S. patent application Ser. No. 16/901,818, filed on Jun. 15, 2020, (now U.S. Pat. No. 11,082,694, issued on Aug. 30, 2021), which is a Continuation of International Application No. PCT/KR19/11517, filed on Sep. 5, 2019, which claims the benefit of U.S. Provisional Application No. 62/727,526, filed on Sep. 5, 2018, the contents of which are all hereby incorporated by reference herein in their entirety.

TECHNICAL FIELD

The present disclosure relates to a method and apparatus for processing image signals, and particularly, to a method and apparatus for encoding or decoding image signals by performing a transform.

BACKGROUND ART

Compression coding refers to a signal processing technique for transmitting digitalized information through a communication line or storing the same in an appropriate form in a storage medium. Media such as video, images and audio can be objects of compression coding and, particularly, a technique of performing compression coding on images is called video image compression.

Next-generation video content will have features of a high spatial resolution, a high frame rate and high dimensionality of scene representation. To process such content, memory storage, a memory access rate and processing power will significantly increase.

Therefore, it is necessary to design a coding tool for processing next-generation video content more efficiently. Particularly, video codec standards after the high efficiency video coding (HEVC) standard require an efficient transform technique for transforming a spatial domain video signal into a frequency domain signal along with a prediction technique with higher accuracy.

DISCLOSURE

Technical Problem

Embodiments of the present disclosure provides a image signal processing method and apparatus applying a transform having high coding efficiency and low complexity.

The technical problems solved by the present disclosure are not limited to the above technical problems and other technical problems which are not described herein will become apparent to those skilled in the art from the following description.

Technical Solution

A method for decoding an image signal according to an embodiment of the present disclosure may include determining an input length and an output length of a non-separable transform based on a height and a width of a current block; determining a non-separable transform matrix corresponding to the input length and the output length of a non-separable transform; and applying the non-separable transform matrix to coefficients by a number of the input length in the current block, wherein the height and the width of a current block is greater than or equal to 8, wherein, if each of the height and the width of a current block is equal to 8, the input length of the non-separable transform is determined as 8.

Furthermore, if the height and the width of a current block is not equal to 8, the input length of the non-separable transform may be determined as 16.

Furthermore, the output length may be determined as 48 or 64.

Furthermore, applying the non-separable transform matrix to the current block may include applying the non-separable transform matrix to a top-left 4×4 region of the current block if each of the height and the width of a current block is not equal to 8 and a multiplication of the width and the height is less than a threshold value.

Furthermore, determining the non-separable transform matrix may include determining a non-separable transform set index based on an intra prediction mode of the current block; determining a non-separable transform kernel corresponding to a non-separable transform index in non-separable transform set included in the non-separable transform set index; and determining the non-separable transform matrix from the non-separable transform based on the input length and the output length.

An apparatus for decoding an image signal according to another embodiment of the present disclosure may include a memory configured to store the video signal; and a processor coupled to the memory, wherein the processor is configured to: determine an input length and an output length of a non-separable transform based on a height and a width of a current block; determine a non-separable transform matrix corresponding to the input length and the output length of a non-separable transform; and apply the non-separable transform matrix to coefficients by a number of the input length in the current block, wherein the height and the width of a current block is greater than or equal to 8, wherein, if each of the height and the width of a current block is equal to 8, the input length of the non-separable transform is determined as 8.

Advantageous Effects

According to embodiment of the present disclosure, video coding method and apparatus having high coding efficiency and low complexity may be provided by applying a transform based on a size of a current block The effects of the present disclosure are not limited to the above-described effects and other effects which are not described herein will become apparent to those skilled in the art from the following description.

Description of Drawings

The accompanying drawings, which are included herein as a part of the description for help understanding the present disclosure, provide embodiments of the present disclosure, and describe the technical features of the present disclosure with the description below.

FIG. 1 is a block diagram schematically illustrating an encoding device to encode video/image signals according to an embodiment of the disclosure;

FIG. 2 is a block diagram schematically illustrating a decoding device to decode image signals according to an embodiment of the disclosure;

FIGS. 3A, 3B, 3C, and 3D are views illustrating block split structures by quad tree (QT), binary tree (BT), ternary tree (TT), and asymmetric tree (AT), respectively, according to embodiments of the disclosure;

FIG. 4 is a block diagram schematically illustrating the encoding device of FIG. 1, which includes a transform and quantization unit, according to an embodiment of the disclosure and FIG. 5 is a block diagram schematically illustrating a decoding device including an inverse-quantization and inverse-transform unit according to an embodiment of the disclosure;

FIG. 6 is a flowchart illustrating an example of encoding a video signal via primary transform and secondary transform according to an embodiment of the disclosure;

FIG. 7 is a flowchart illustrating an example of decoding a video signal via secondary inverse-transform and primary inverse-transform according to an embodiment of the disclosure;

FIG. 8 illustrates an example transform configuration group to which adaptive multiple transform (AMT) applies, according to an embodiment of the disclosure;

FIG. 9 is a flowchart illustrating encoding to which AMT is applied according to an embodiment of the disclosure;

FIG. 10 is a flowchart illustrating decoding to which AMT is applied according to an embodiment of the disclosure;

FIG. 11 is a flowchart illustrating an example of encoding an AMT flag and an AMT index according to an embodiment of the disclosure;

FIG. 12 is a flowchart illustrating example decoding for performing transform based on an AMT flag and an AMT index;

FIG. 13 is a diagram illustrating Givens rotation according to an embodiment of the disclosure, and FIG. 14 illustrates a configuration of one round in a 4×4 NSST constituted of permutations and a Givens rotation layer according to an embodiment of the disclosure;

FIG. 15 illustrates an example configuration of non-split transform set per intra prediction mode according to an embodiment of the disclosure;

FIG. 16 illustrates three types of forward direction scan orders for a transform coefficient or a transform coefficient block applied in HEVC (high efficiency video coding) standard, herein, (a) shows diagonal scan, (b) shows horizontal scan, and (c) shows vertical scan.

FIG. 17 illustrates the position of the transform coefficient in a case a forward diagonal scan is applied when 4×4 RST applies to a 4×8 block, according to an embodiment of the disclosure, and FIG. 18 illustrates an example of merging the valid transform coefficients of two 4×4 blocks into a single block according to an embodiment of the disclosure;

FIG. 19 illustrates an example method of configuring a mixed NSST set per intra prediction mode according to an embodiment of the disclosure;

FIG. 20 illustrates an example method of selecting an NSST set (or kernel) considering the size of transform block and an intra prediction mode according to an embodiment of the disclosure;

FIGS. 21A and 21B illustrate forward and inverse reduced transform according to an embodiment of the disclosure;

FIG. 22 is a flowchart illustrating an example of decoding using a reduced transform according to an embodiment of the disclosure;

FIG. 23 is a flowchart illustrating an example for applying a conditional reduced transform according to an embodiment of the disclosure;

FIG. 24 is a flowchart illustrating an example of decoding for secondary inverse-transform to which a conditional reduced transform applies, according to an embodiment of the disclosure;

FIGS. 25A, 25B, 26A, and 26B illustrate examples of reduced transform and reduced inverse-transform according to an embodiment of the disclosure;

FIG. 27 illustrates an example area to which a reduced secondary transform applies according to an embodiment of the disclosure;

FIG. 28 illustrates a reduced transform per a reduced factor according to an embodiment of the disclosure;

FIG. 29 illustrates an example of encoding flowchart performing a transform as an embodiment to which the present disclosure is applied.

FIG. 30 illustrates an example of decoding flowchart performing a transform as an embodiment to which the present disclosure is applied.

FIG. 31 illustrates an example of detailed block diagram of a transformer 120 in the encoding apparatus 100 as an embodiment to which the present disclosure is applied.

FIG. 32 illustrates an example of detailed block diagram of the inverse transformer 230 in the decoding apparatus as an embodiment to which the present disclosure is applied.

FIG. 33 illustrates an example of decoding flowchart to which a transform is applied according to an embodiment of the present disclosure.

FIG. 34 illustrates an example of a block diagram of an apparatus for processing a video signal as an embodiment to which the present disclosure is applied.

FIG. 35 illustrates an example of an image coding system as an embodiment to which the present disclosure is applied.

FIG. 36 is a structural diagram of a contents streaming system as an embodiment to which the present disclosure is applied.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Further, the processing unit may be interpreted into the meaning including a unit for a luma component and a unit for a chroma component. For example, the processing unit may correspond to a block, a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

As used herein, "pixel" and "coefficient" (e.g., a transform coefficient or a transform coefficient that has undergone first transform) may be collectively referred to as a sample. When a sample is used, this may mean that, e.g., a pixel value or coefficient (e.g., a transform coefficient or a transform coefficient that has undergone first transform) is used.

Hereinafter, a method of designing and applying a reduced secondary transform (RST) considering the computational complexity in the worst case scenario is described in relation to encoding/decoding of still images or videos.

Embodiments of the disclosure provide methods and devices for compressing images and videos. Compressed data has the form of a bitstream, and the bitstream may be stored in various types of storage and may be streamed via a network to a decoder-equipped terminal. If the terminal has a display device, the terminal may display the decoded image on the display device or may simply store the bitstream data. The methods and devices proposed according to embodiments of the disclosure are applicable to both encoders and decoders or both bitstream generators and bitstream receivers regardless of whether the terminal outputs the same through the display device.

An image compressing device largely includes a prediction unit, a transform and quantization unit, and an entropy coding unit. FIGS. 1 and 2 are block diagrams schematically illustrating an encoding device and a decoding device, respectively. Of the components, the transform and quantization unit transforms the residual signal, which results from subtracting the prediction signal from the raw signal, into a frequency-domain signal via, e.g., discrete cosine transform (DCT)-2 and applies quantization to the frequency-domain signal, thereby enabling image compression, with the number of non-zero signals significantly reduced.

FIG. 1 is a block diagram schematically illustrating an encoding device to encode video/image signals according to an embodiment of the disclosure.

The image splitter 110 may split the image (or picture or frame) input to the encoding apparatus 100 into one or more processing units. As an example, the processing unit may be referred to as a coding unit (CU). In this case, the coding unit may be recursively split into from a coding tree unit (CTU) or largest coding unit (LCU), according to a quad-tree binary-tree (QTBT) structure. For example, one coding unit may be split into a plurality of coding units of a deeper depth based on the quad tree structure and/or binary tree structure. In this case, for example, the quad tree structure may be applied first, and the binary tree structure may then be applied. Or, the binary tree structure may be applied first. A coding procedure according to an embodiment of the disclosure may be performed based on the final coding unit that is not any longer split. In this case, the largest coding unit may immediately be used as the final coding unit based on, e.g., coding efficiency per image properties or, as necessary, the coding unit may be recursively split into coding units of a lower depth, and the coding unit of the optimal size may be used as the final coding unit. The coding procedure may include, e.g., prediction, transform, or reconstruction described below. As an example, the proceeding unit may further include the prediction unit PU or transform unit TU. In this case, the prediction unit and transform unit each may be split into or partitioned from the above-described final coding unit. The prediction unit may be a unit of sample prediction, and the transform unit may be a unit for deriving the transform coefficient and/or a unit for deriving the residual signal from the transform coefficient.

The term "unit" may be interchangeably used with "block" or "area" in some cases. Generally, M×N block may denote a set of samples or transform coefficients consisting of M columns and N rows. Generally, sample may denote the pixel or pixel value or may denote the pixel/pixel value of only the luma component or the pixel/pixel value of only the chroma component. Sample may be used as a term corresponding to the pixel or pel of one picture (or image).

The encoding apparatus 100 may generate a residual signal (residual block or residual sample array) by subtracting the prediction signal (predicted block or prediction sample array) output from the inter predictor 180 or intra predictor 185 from the input image signal (raw block or raw sample array), and the generated residual signal is transmitted to the transformer 120. In this case, as shown, the unit for subtracting the prediction signal (prediction block or prediction sample array) from the input image signal (raw block or raw sample array) in the encoder 100 may be referred to as the subtractor 115. The predictor may perform prediction on the target block for processing (hereinafter, current block) and generate a predicted block including prediction samples for the current block. The predictor may determine whether intra prediction or inter prediction is applied in each block or CU unit. The predictor may generate various pieces of information for prediction, such as prediction mode information, as described below in connection with each prediction mode, and transfer the generated information to the entropy encoder 190. The prediction-related information may be encoded by the entropy encoder 190 and be output in the form of a bitstream.

The intra predictor 185 may predict the current block by referencing the samples in the current picture. The referenced samples may neighbor, or be positioned away from, the current block depending on the prediction mode. In the intra prediction, the prediction modes may include a plurality of non-directional modes and a plurality of directional modes. The non-directional modes may include, e.g., a DC mode and a planar mode. The directional modes may include, e.g., 33 directional prediction modes or 65 directional prediction modes depending on how elaborate the prediction direction is. However, this is merely an example, and more or less directional prediction modes may be used. The intra predictor 185 may determine the prediction mode applied to the current block using the prediction mode applied to the neighboring block.

The inter predictor 180 may derive a predicted block for the current block, based on a reference block (reference sample array) specified by a motion vector on the reference picture. Here, to reduce the amount of motion information transmitted in the inter prediction mode, the motion information may be predicted per block, subblock, or sample based on the correlation in motion information between the neighboring block and the current block. The motion information may include the motion vector and a reference picture index. The motion information may further include inter prediction direction (L0 prediction, L1 prediction, or Bi prediction) information. In the case of inter prediction, neighboring blocks may include a spatial neighboring block present in the current picture and a temporal neighboring block present in the reference picture. The reference picture including the reference block may be identical to, or different from, the reference picture including the temporal neighboring block. The temporal neighboring block may be termed, e.g., co-located reference block or co-located CU (colCU), and the reference picture including the temporal neighboring block may be termed a co-located picture (colPic). For example, the inter predictor 180 may construct a motion information candidate list based on neighboring blocks and generate information indicating what candidate is used to derive the motion vector and/or reference picture index of the current block. Inter prediction may be performed based on various prediction modes. For example, in skip mode or merge mode, the inter predictor 180 may use the motion information for the neighboring block as motion information for the current block. In skip mode, unlike in merge mode, no residual signal may be transmitted. In motion vector prediction (MVP) mode, the motion vector of the neighboring block may be used as a motion vector predictor, and a motion vector difference may be signaled, thereby indicating the motion vector of the current block.

The prediction signal generated via the inter predictor 180 or intra predictor 185 may be used to generate a reconstructed signal or a residual signal.

The transformer 120 may apply a transform scheme to the residual signal, generating transform coefficients. For example, the transform scheme may include at least one of a discrete cosine transform (DCT), discrete sine transform (DST), Karhunen-Loeve transform (KLT), graph-based transform (GBT), or conditionally non-linear transform (CNT). The GBT means a transform obtained from a graph in which information for the relationship between pixels is represented. The CNT means a transform that is obtained based on generating a prediction signal using all previously reconstructed pixels. Further, the transform process may apply to squared pixel blocks with the same size or may also apply to non-squared, variable-size blocks.

The quantizer 130 may quantize transform coefficients and transmit the quantized transform coefficients to the entropy encoder 190, and the entropy encoder 190 may encode the quantized signal (information for the quantized transform coefficients) and output the encoded signal in a bitstream. The information for the quantized transform coefficients may be referred to as residual information. The quantizer 130 may re-sort the block-shaped quantized transform coefficients in the form of a one-dimension vector, based on a coefficient scan order and generate the information for the quantized transform coefficients based on the one-dimensional form of quantized transform coefficients. The entropy encoder 190 may perform various encoding methods, such as, e.g., exponential Golomb, context-adaptive variable length coding (CAVLC), or context-adaptive binary arithmetic coding (CABAC). The entropy encoder 190 may encode the values of pieces of information (e.g., syntax elements) necessary to reconstruct the video/image, along with or separately from the quantized transform coefficients. The encoded information (e.g., video/image information) may be transmitted or stored in the form of a bitstream, on a per-network abstraction layer (NAL) unit basis. The bitstream may be transmitted via the network or be stored in the digital storage medium. The network may include, e.g., a broadcast network and/or communication network, and the digital storage medium may include, e.g., USB, SD, CD, DVD, Blu-ray, HDD, SSD, or other various storage media. A transmitter (not shown) for transmitting, and/or a storage unit (not shown) storing, the signal output from the entropy encoder 190 may be configured as an internal/external element of the encoding device 100, or the transmitter may be a component of the entropy encoder 190.

The quantized transform coefficients output from the quantizer 130 may be used to generate the prediction signal. For example, the residual signal may be reconstructed by applying inverse quantization and inverse transform on the quantized transform coefficients via the inverse quantizer 140 and inverse transformer 150 in the loop. The adder 155 may add the reconstructed residual signal to the prediction signal output from the inter predictor 180 or intra predictor 185, thereby generating the reconstructed signal (reconstructed picture, reconstructed block, or reconstructed sample array). As in the case where skip mode is applied, when there is no residual for the target block for processing, the predicted block may be used as the reconstructed block. The adder 155 may be denoted a reconstructor or reconstructed block generator. The generated reconstructed signal may be used for intra prediction of the next target processing block in the current picture and, as described below, be filtered and then used for inter prediction of the next picture.

The filter 160 may enhance the subjective/objective image quality by applying filtering to the reconstructed signal. For example, the filter 160 may generate a modified reconstructed picture by applying various filtering methods to the reconstructed picture and transmit the modified reconstructed picture to the decoding picture buffer 170. The various filtering methods may include, e.g., deblocking filtering, sample adaptive offset, adaptive loop filter, or bilateral filter. The filter 160 may generate various pieces of information for filtering and transfer the resultant information to the entropy encoder 190 as described below in connection with each filtering method. The filtering-related information may be encoded by the entropy encoder 190 and be output in the form of a bitstream.

The modified reconstructed picture transmitted to the decoding picture buffer 170 may be used as the reference picture in the inter predictor 180. The encoding device 100, when inter prediction is applied thereby, may avoid a prediction mismatch between the encoding apparatus 100 and the decoding device and enhance coding efficiency.

The decoding picture buffer 170 may store the modified reconstructed picture for use as the reference picture in the inter predictor 180.

FIG. 2 is a block diagram schematically illustrating a decoding device to decode image signals according to an embodiment of the disclosure.

Referring to FIG. 2, a decoding apparatus 200 may include an entropy decoder 210, an inverse quantizer 220, an inverse transformer 230, an adder 235, a filter 240, a decoding picture buffer 250, an inter predictor 260, and an intra predictor 265. The inter predictor 260 and the intra predictor 265 may be collectively referred to as a predictor. In other words, the predictor may include the inter predictor 180 and the intra predictor 185. The inverse quantizer 220 and the inverse transformer 230 may be collectively referred to as a residual processor. In other words, the residual processor may include the inverse quantizer 220 and the inverse transformer 230. The entropy decoder 210, the inverse quantizer 220, the inverse transformer 230, the adder 235, the filter 240, the inter predictor 260, and the intra predictor 265 may be configured in a single hardware component (e.g., a decoder or processor) according to an embodiment. The decoding picture buffer 250 may be implemented as a single hardware component (e.g., a memory or digital storage medium) according to an embodiment.

When a bitstream including video/image information is input, the decoding apparatus 200 may reconstruct the image corresponding to the video/image information process in the encoding apparatus 100 of FIG. 2. For example, the decoding apparatus 200 may perform decoding using the processing unit applied in the encoding device 100. Thus, upon decoding, the processing unit may be, e.g., a coding unit, and the coding unit may be split from the coding tree unit or largest coding unit, according to the quad tree structure and/or binary tree structure. The reconstructed image signal decoded and output through the decoding apparatus 200 may be played via a player.

The decoding apparatus 200 may receive the signal output from the encoding apparatus 100 of FIG. 2, in the form of a bitstream, and the received signal may be decoded via the entropy decoder 210. For example, the entropy decoder 210 may parse the bitstream and extract information (e.g., video/image information) necessary for image reconstruction (or picture reconstruction). For example, the entropy decoder 210 may decode the information in the bitstream based on a coding method, such as exponential Golomb encoding, CAVLC, or CABAC and may output the values of syntax elements necessary for image reconstruction and quantized values of transform coefficients regarding the residual. Specifically, the CABAC entropy decoding method may receive a bin corresponding to each syntax element in the bitstream, determine a context model using decoding target syntax element information, decoding information for neighboring and decoding target block, or information for the symbol/bin decoded in the prior step, predict the probability of occurrence of a bin according to the determined context model, and performing the arithmetic decoding of the bin. At this time, after determining the context model, the CABAC entropy decoding method may update the context model using information for the symbol/bin decoded for the context model of the next symbol/bin. Among the pieces of information decoded by the entropy decoder 210, information for prediction may be provided to the predictor (e.g., the inter predictor 260 and intra predictor 265), and the residual value entropy-decoded by the entropy decoder 210, i.e., the quantized transform coefficients and relevant processor information, may be input to the inverse quantizer 220. Among the pieces of information decoded by the entropy decoder 210, information for filtering may be provided to the filter 240. Meanwhile, a receiver (not shown) for receiving the signal output from the encoding apparatus 100 may further be configured as an internal/external element of the decoding device 200, or the receiver may be a component of the entropy decoder 210.

The inverse quantizer 220 may inverse-quantize the quantized transform coefficients and output the transform coefficients. The inverse quantizer 220 may re-sort the quantized transform coefficients in the form of a two-dimensional block. In this case, the re-sorting may be performed based on the coefficient scan order in which the encoding apparatus 100 has performed. The inverse quantizer 220 may inverse-quantize the quantized transform coefficients using quantization parameters (e.g., quantization step size information), obtaining transform coefficients.

The inverse transformer 230 obtains the residual signal (residual block or residual sample array) by inverse-transforming the transform coefficients.

The predictor may perform prediction on the current block and generate a predicted block including prediction samples for the current block. The predictor may determine which one of intra prediction or inter prediction is applied to the current block based on information for prediction output from the entropy decoder 210 and determine a specific intra/inter prediction mode.

The intra predictor 265 may predict the current block by referencing the samples in the current picture. The referenced samples may neighbor, or be positioned away from, the current block depending on the prediction mode. In the intra prediction, the prediction modes may include a plurality of non-directional modes and a plurality of directional modes. The intra predictor 265 may determine the prediction mode applied to the current block using the prediction mode applied to the neighboring block.

The inter predictor 260 may derive a predicted block for the current block, based on a reference block (reference sample array) specified by a motion vector on the reference picture. Here, to reduce the amount of motion information transmitted in the inter prediction mode, the motion information may be predicted per block, subblock, or sample based on the correlation in motion information between the neighboring block and the current block. The motion information may include the motion vector and a reference picture index. The motion information may further include inter prediction direction (L0 prediction, L1 prediction, or Bi prediction) information. In the case of inter prediction, neighboring blocks may include a spatial neighboring block present in the current picture and a temporal neighboring block present in the reference picture. For example, the inter predictor 260 may construct a motion information candidate list based information related to prediction of on the neighboring blocks and derive the motion vector and/or reference picture index of the current block based on the received candidate selection information. Inter prediction may be performed based on various prediction modes. The information for prediction may include information indicating the mode of inter prediction for the current block.

The adder 235 may add the obtained residual signal to the prediction signal (e.g., predicted block or prediction sample array) output from the inter predictor 260 or intra predictor 265, thereby generating the reconstructed signal (reconstructed picture, reconstructed block, or reconstructed sample array). As in the case where skip mode is applied, when there is no residual for the target block for processing, the predicted block may be used as the reconstructed block.

The adder 235 may be denoted a reconstructor or reconstructed block generator. The generated reconstructed signal may be used for intra prediction of the next target processing block in the current picture and, as described below, be filtered and then used for inter prediction of the next picture.

The filter 240 may enhance the subjective/objective image quality by applying filtering to the reconstructed signal. For example, the filter 240 may generate a modified reconstructed picture by applying various filtering methods to the reconstructed picture and transmit the modified reconstructed picture to the decoding picture buffer 250. The various filtering methods may include, e.g., deblocking filtering, sample adaptive offset (SAO), adaptive loop filter (ALF), or bilateral filter.

The modified reconstructed picture transmitted to the decoding picture buffer 250 may be used as the reference picture by the inter predictor 260.

In the disclosure, the embodiments described above in connection with the filter 160, the inter predictor 180, and the intra predictor 185 of the encoding apparatus 100 may be applied, in the same way as, or to correspond to, the filter 240, the inter predictor 260, and the intra predictor 265 of the decoding device 200.

FIGS. 3A, 3B, 3C, and 3D are views illustrating block split structures by quad tree (QT), binary tree (BT), ternary tree (TT), and asymmetric tree (AT), respectively, according to embodiments of the disclosure.

In video coding, one block may be split based on the QT. One subblock split into by the QT may further be split recursively by the QT. The leaf block which is not any longer split by the QT may be split by at least one scheme of the BT, TT, or AT. The BT may have two types of splitting, such as horizontal BT (2N×N, 2N×N) and vertical BT(N×2N, N×2N). The TT may have two types of splitting, such as horizontal TT(2N×½N, 2N×N, 2N×½N) and vertical TT (½N×2N, N×2N, ½N×2N). The AT may have four types of splitting, such as horizontal-up AT(2N×½N, 2N×3/2N), horizontal-down AT(2N×3/2N, 2N×½N), vertical-left AT(½N×2N, 3/2N×2N), and vertical-right AT(3/2N×2N, ½N×2N). The BT, TT, and AT each may be further split recursively using the BT, TT, and AT.

FIG. 3A shows an example of QT splitting. Block A may be split into four subblocks (A0, A1, A2, A3) by the QT. Subblock A1 may be split again into four subblocks (B0, B1, B2, B3) by the QT.

FIG. 3B shows an example of BT splitting. Block B3, which is not any longer split by the QT, may be split into vertical BT(C0, C1) or horizontal BT(D0, D1). Like block C0, each subblock may be further split recursively, e.g., in the form of horizontal BT(E0, E1) or vertical BT(F0, F1).

FIG. 3C shows an example of TT splitting. Block B3, which is not any longer split by the QT, may be split into vertical TT(C0, C1, C2) or horizontal TT(D0, D1, D2). Like block C1, each subblock may be further split recursively, e.g., in the form of horizontal TT(E0, E1, E2) or vertical TT(F0, F1, F2).

FIG. 3D shows an example of AT splitting. Block B3, which is not any longer split by the QT, may be split into vertical AT(C0, C1) or horizontal AT(D0, D1). Like block C1, each subblock may be further split recursively, e.g., in the form of horizontal AT(E0, E1) or vertical TT(F0, F1).

Meanwhile, the BT, TT, and AT may be used together. For example, the subblock split by the BT may be split by the TT or AT. Further, the subblock split by the TT may be split by the BT or AT. The subblock split by the AT may be split by the BT or TT. For example, after split by the horizontal BT, each subblock may be split by the vertical BT or, after split by the vertical BT, each subblock may be split by the horizontal BT. In this case, although different splitting orders are applied, the final shape after split may be identical.

When a block is split, various orders of searching for the block may be defined. Generally, a search is performed from the left to right or from the top to bottom. Searching for a block may mean the order of determining whether to further split each subblock split into or, if the block is not split any longer, the order of encoding each subblock, or the order of search when the subblock references other neighboring block.

A transform may be performed per processing unit (or transform block) split by the splitting structure as shown in FIG. 3A to 3D. In particular, it may be split per the row direction and column direction, and a transform matrix may apply. According to an embodiment of the disclosure, other types of transform may be used along the row direction or column direction of the processing unit (or transform block).

FIGS. 4 and 5 are the embodiments to which the disclosure is applied. FIG. 4 is a block diagram schematically illustrating the encoding apparatus 100 of FIG. 1, which includes a transform and quantization unit 120/130, according to an embodiment of the disclosure and FIG. 5 is a block diagram schematically illustrating a decoding apparatus 200 including an inverse-quantization and inverse-transform unit 220/230 according to an embodiment of the disclosure.

Referring to FIG. 4, the transform and quantization unit 120/130 may include a primary transform unit 121, a secondary transform unit 122, and a quantizer 130. The inverse quantization and inverse transform unit 140/150 may include an inverse quantizer 140, an inverse secondary transform unit 151, and an inverse primary transform unit 152.

Referring to FIG. 5, the inverse quantization and inverse transform unit 220/230 may include an inverse quantizer 220, an inverse secondary transform unit 231, and an inverse primary transform unit 232.

In the disclosure, transform may be performed through a plurality of steps. For example, as shown in FIG. 4, two steps of primary transform and secondary transform may be applied, or more transform steps may be applied depending on the algorithm. Here, the primary transform may be referred to as a core transform.

The primary transform unit 121 may apply primary transform to the residual signal. Here, the primary transform may be previously defined as a table in the encoder and/or decoder.

The secondary transform unit 122 may apply secondary transform to the primary transformed signal. Here, the secondary transform may be previously defined as a table in the encoder and/or decoder.

According to an embodiment, a non-separable secondary transform (NSST) may be conditionally applied as the secondary transform. For example, the NSST may be applied only to intra prediction blocks and may have a transform set applicable to each prediction mode group.

Here, the prediction mode group may be set based on the symmetry for the prediction direction. For example, since prediction mode 52 and prediction mode 16 are symmetrical with respect to prediction mode 34 (diagonal direction), they may form one group and the same transform set may be applied thereto. Upon applying transform for the prediction mode 52, after input data is transposed, the transform is applied to the transposed input data and this is because the transform set of the prediction mode 52 is same as that of the prediction mode 16.

Meanwhile, since the planar mode and DC mode lack directional symmetry, they have their respective transform sets, and each transform set may consist of two transforms. For the other directional modes, each transform set may consist of three transforms.

The quantizer 130 may perform quantization on the secondary-transformed signal.

The inverse quantization and inverse transform unit 140/150 may inversely perform the above-described process, and no duplicate description is given.

FIG. 5 is a block diagram schematically illustrating the inverse quantization and inverse transform unit 220/230 in the decoding device 200.

Referring to FIG. 5, the inverse quantization and inverse transform unit 220/230 may include an inverse quantizer 220, an inverse secondary transform unit 231, and an inverse primary transform unit 232.

The inverse quantizer 220 obtains transform coefficients from the entropy-decoded signal using quantization step size information.

The inverse secondary transform unit 231 performs an inverse secondary transform on the transform coefficients. Here, the inverse secondary transform represents an inverse transform of the secondary transform described above in connection with FIG. 4.

The inverse primary transform unit 232 performs an inverse primary transform on the inverse secondary-transformed signal (or block) and obtains the residual signal. Here, the inverse primary transform represents an inverse transform of the primary transform described above in connection with FIG. 4.

FIG. 6 is a flowchart illustrating an example of encoding a video signal via primary transform and secondary transform according to an embodiment of the disclosure. The operations of FIG. 6 may be performed by the transformer 120 of the encoding device 100.

The encoding apparatus 100 may determine (or select) a forward secondary transform based on at least one of the prediction mode, block shape, and/or block size of a current block (S610).

The encoding apparatus 100 may determine the optimal forward secondary transform via rate-distortion (RD) optimization. The optimal forward secondary transform may correspond to one of a plurality of transform combinations, and the plurality of transform combinations may be defined by a transform index. For example, for the RD optimization, the encoding apparatus 100 may compare all of the results of performing forward secondary transform, quantization, and residual coding for respective candidates.

The encoding apparatus 100 may signal a second transform index corresponding to the optimal forward secondary transform (S620). Here, other embodiments described in the disclosure may may be applied to the secondary transform index.

Meanwhile, the encoding apparatus 100 may perform a forward primary scan on the current block (residual block) (S630).

The encoding apparatus 100 may perform a forward secondary transform on the current block using the optimal forward secondary transform (S640). Meanwhile, the forward secondary transform may be the RST described below. RST means a transform by which N pieces of residual data (N×1 residual vectors) are input, and R (R<N) pieces of transform coefficient data (R×1 transform coefficient vectors) are output.

According to an embodiment, the RST may be applied to a specific area of the current block. For example, when the current block is N×N, the specific area may mean the top-left N/2×N/2 area. However, the disclosure is not limited thereto, and the specific area may be set to differ depending on at least one of the prediction mode, block shape, or block size. For example, when the current block is N×N, the specific area may mean the top-left M×M area (M≥N).

Meanwhile, the encoding apparatus 100 may perform quantization on the current block, thereby generating a transform coefficient block (S650).

The encoding apparatus 100 may perform entropy encoding on the transform coefficient block, thereby generating a bitstream.

FIG. 7 is a flowchart illustrating an example of decoding a video signal via secondary inverse-transform and primary inverse-transform according to an embodiment of the disclosure. The operations of FIG. 7 may be performed by the inverse transformer 230 of the decoding device 200.

The decoding apparatus 200 may obtain the secondary transform index from the bitstream.

The decoding apparatus 200 may induce secondary transform corresponding to the secondary transform index.

However, steps S710 and S720 amount to a mere embodiment, and the disclosure is not limited thereto. For example, the decoding apparatus 200 may induce the secondary transform based on at least one of the prediction mode, block shape, and/or block size of the current block, without obtaining the secondary transform index.

Meanwhile, the decoder 200 may obtain the transform coefficient block by entropy-decoding the bitstream and may perform inverse quantization on the transform coefficient block (S730).

The decoder 200 may perform inverse secondary transform on the inverse-quantized transform coefficient block (S740). For example, the inverse secondary transform may be the inverse RST. The inverse RST is the transposed matrix of the RST described above in connection with FIG. 6 and means a transform by which R pieces of transform coefficient data (R×1 transform coefficient vectors) are input, and N pieces of residual data (N×1 residual vectors) are output.

According to an embodiment, reduced secondary transform may be applied to a specific area of the current block. For example, when the current block is N×N, the specific area may mean the top-left N/2×N/2 area. However, the disclosure is not limited thereto, and the specific area may be set to differ depending on at least one of the prediction mode, block shape, or block size. For example, when the current block is N×N, the specific area may mean the top-left M×M area (M≥N) or M×L (M≥N, L≥N).

The decoder 200 may perform inverse primary transform on the result of the inverse secondary transform (S750).

The decoder 200 generates a residual block via step S750 and generates a reconstructed block by adding the residual block and a prediction block.

FIG. 8 illustrates an example transform configuration group to which adaptive multiple transform (AMT) applies, according to an embodiment of the disclosure.

Referring to FIG. 8, the transform configuration group may be determined based on the prediction mode, and there may be a total of six (G0 to G5) groups. G0 to G4 correspond to the case where intra prediction applies, and G5 represents transform combinations (or transform set or transform combination set) applied to the residual block generated by inter prediction.

One transform combination may consist of the horizontal transform (or row transform) applied to the rows of a two-dimensional block and the vertical transform (or column transform) applied to the columns of the two-dimensional block.

Here, each transform configuration group may include four transform combination candidates. The four transform combination candidates may be selected or determined via the transform combination indexes of 0 to 3, and the transform combination indexes may be transmitted from the encoding apparatus 100 to the decoding apparatus 200 via an encoding procedure.

According to an embodiment, the residual data (or residual signal) obtained via intra prediction may have different statistical features depending on intra prediction modes. Thus, transforms other than the regular cosine transform may be applied per prediction mode as shown in FIG. 8. The transform type may be represented herein as DCT-Type 2, DCT-II, or DCT-2.

FIG. 8 illustrates the respective transform set configurations of when 35 intra prediction modes are used and when 67 intra prediction modes are used. A plurality of transform combinations may apply per transform configuration group differentiated in the intra prediction mode columns. For example, the plurality of transform combinations (transforms along the row direction, transforms along the column direction) may consist of four combinations. More specifically, since in group 0 DST-7 and DCT-5 may applied to both the row (horizontal) direction and column (vertical) direction, four combinations are possible.

Since a total of four transform kernel combinations may apply to each intra prediction mode, the transform combination index for selecting one of them may be transmitted per transform unit. In the disclosure, the transform combination index may be denoted an AMT index and may be represented as amt_idx.

In kernels other than the one proposed in FIG. 8, there is the occasion that DCT-2 is optimal to both the row direction and column direction by the nature of the residual signal. Thus, transform may be adaptively performed by defining an AMT flag per coding unit. Here, if the AMT flag is 0, DCT-2 may be applied to both the row direction and column direction and, if the AMT flag is 1, one of the four combinations may be selected or determined via the AMT index.

According to an embodiment, in a case where the AMT flag is 0, if the number of transform coefficients is 3 or less for one transform unit, the transform kernels of FIG. 8 are not applied, and DST-7 may be applied to both the row direction and column direction.

According to an embodiment, the transform coefficient values are first parsed and, if the number of transform coefficients is 3 or less, the AMT index is not parsed, and DST-7 may be applied, thereby reducing the transmissions of additional information.

According to an embodiment, the AMT may apply only when the width and height of the transform unit, both, are 32 or less.

According to an embodiment, FIG. 8 may be previously set via off-line training.

According to an embodiment, the AMT index may be defined with one index that may simultaneously indicate the combination of horizontal transform and vertical transform. Or, the AMT index may be separately defined with a horizontal transform index and a vertical transform index.

Like the above-described AMT, a scheme of applying a transform selected from among the plurality of kernels (e.g., DCT-2, DST-7, and DCT-8) may be denoted as multiple transform selection (MTS) or enhanced multiple transform (EMT), and the AMT index may be denoted as an MTS index.

FIG. 9 is a flowchart illustrating encoding to which AMT is applied according to an embodiment of the disclosure. The operations of FIG. 9 may be performed by the transformer 120 of the encoding device 100.

Although the disclosure basically describes applying transform separately for the horizontal direction and vertical direction, a transform combination may be constituted of non-separable transforms.

Or, separable transforms and non-separable transforms may be mixed. In this case, if a non-separable transform is used, transform selection per row/column direction or selection per horizontal/vertical direction is unnecessary and, only when a separable transform is selected, the transform combinations of FIG. 8 may come into use.

Further, the schemes proposed in the disclosure may be applied regardless of whether it is the primary transform or secondary transform. In other words, there is no such a limitation that either should be applied but both may rather be applied. Here, primary transform may mean transform for first transforming the residual block, and secondary transform may mean transform applied to the block resultant from the primary transform.

First, the encoding apparatus 100 may determine a transform configuration group corresponding to a current block (S910). Here, the transform configuration group may be constituted of the combinations as shown in FIG. 8.

The encoding apparatus 100 may perform transform on candidate transform combinations available in the transform configuration group (S920).

As a result of performing the transform, the encoding apparatus 100 may determine or select a transform combination with the smallest rate distortion (RD) cost (S930).

The encoding apparatus 100 may encode a transform combination index corresponding to the selected transform combination (S940).

FIG. 10 is a flowchart illustrating decoding to which AMT is applied according to an embodiment of the disclosure. The operations of FIG. 10 may be performed by the inverse transformer 230 of the decoding device 200.

First, the decoding apparatus 200 may determine a transform configuration group for a current block (S1010). The decoding apparatus 200 may parse (or obtain) the transform combination index from the video signal, wherein the transform combination index may correspond to any one of the plurality of transform combinations in the transform configuration group (S1020). For example, the transform configuration group may include DCT-2, DST-7, or DCT-8.

The decoding apparatus 200 may induce the transform combination corresponding to the transform combination index (S1030). Here, the transform combination may consist of the horizontal transform and vertical transform and may include at least one of DCT-2, DST-7, or DCT-8. Further, as the transform combination, the transform combination described above in connection with FIG. 8 may be used.

The decoding apparatus 200 may perform inverse transform on the current block based on the induced transform combination (S1040). Where the transform combination consists of row (horizontal) transform and column (vertical) transform, the row (horizontal) transform may be applied first and, then, the column (vertical) transform may apply. However, the disclosure is not limited thereto, and its opposite way may be applied or, if consisting of only non-separable transforms, non-separable transform may immediately be applied.

According to an embodiment, if the vertical transform or horizontal transform is DST-7 or DCT-8, the inverse transform of DST-7 or the inverse transform of DCT-8 may be applied per column and then per row. Further, in the vertical transform or horizontal transform, different transform may apply per row and/or per column.

According to an embodiment, the transform combination index may be obtained based on the AMT flag indicating whether the AMT is performed. In other words, the transform combination index may be obtained only when the AMT is performed according to the AMT flag. Further, the decoding apparatus 200 may identify whether the number of non-zero transform coefficients is larger than a threshold. At this time, the transform combination index may be parsed only when the number of non-zero transform coefficients is larger than the threshold.

According to an embodiment, the AMT flag or AMT index may be defined at the level of at least one of sequence, picture, slice, block, coding unit, transform unit, or prediction unit.

Meanwhile, according to another embodiment, the process of determining the transform configuration group and the step of parsing the transform combination index may simultaneously be performed. Or, step S1010 may be preset in the encoding apparatus 100 and/or decoding apparatus 200 and be omitted.

FIG. 11 is a flowchart illustrating an example of encoding an AMT flag and an AMT index according to an embodiment of the disclosure. The operations of FIG. 11 may be performed by the transformer 120 of the encoding device 100.

The encoding apparatus 100 may determine whether the AMT is applied to a current block (S1110).

If the AMT is applied, the encoding apparatus 100 may perform encoding with AMT flag=1 (S1120).

The encoding apparatus 100 may determine the AMT index based on at least one of the prediction mode, horizontal transform, or vertical transform of the current block (S1130). Here, the AMT index denotes an index indicating any one of the plurality of transform combinations for each intra prediction mode, and the AMT index may be transmitted per transform unit.

When the AMT index is determined, the encoding apparatus 100 may encode the AMT index (S1140).

On the other hand, unless the AMT is applied, the encoding apparatus 100 may perform encoding with AMT flag=0 (S1150).

FIG. 12 is a flowchart illustrating decoding for performing transform based on an AMT flag and an AMT index.

The decoding apparatus 200 may parse the AMT flag from the bitstream (S1210). Here, the AMT flag may indicate whether the AMT is applied to a current block.

The decoding apparatus 200 may identify whether the AMT is applied to the current block based on the AMT flag (S1220). For example, the decoding apparatus 200 may identify whether the AMT flag is 1.

If the AMT flag is 1, the decoding apparatus 200 may parse the AMT index (S1230). Here, the AMT index denotes an index indicating any one of the plurality of transform combinations for each intra prediction mode, and the AMT index may be transmitted per transform unit. Or, the AMT index may mean an index indicating any one transform combination defined in a preset transform combination table. The preset transform combination table may mean FIG. 8, but the disclosure is not limited thereto.

The decoding apparatus 200 may induce or determine horizontal transform and vertical transform based on at least one of the AMT index or prediction mode (S1240).

Or, the decoding apparatus 200 may induce the transform combination corresponding to the AMT index. For example, the decoding apparatus 200 may induce or determine the horizontal transform and vertical transform corresponding to the AMT index.

Meanwhile, if the AMT flag is 0, the decoding apparatus 200 may apply preset vertical inverse transform per column (S1250). For example, the vertical inverse transform may be the inverse transform of DCT-2.

The decoding apparatus 200 may apply preset horizontal inverse transform per row (S1260). For example, the horizontal inverse transform may be the inverse transform of DCT-2. That is, when the AMT flag is 0, a preset transform kernel may be used in the encoding apparatus 100 or decoding device 200. For example, rather than one defined in the transform combination table as shown in FIG. 8, a transform kernel widely in use may be used.

NSST (Non-Separable Secondary Transform)

Secondary transform denotes applying a transform kernel once again, using the result of application of primary transform as an input. The primary transform may include DCT-2 or DST-7 in the HEVC or the above-described AMT. Non-separable transform denotes, after regarding N×N two-dimension residual block as N2×1 vector, applying N2×N2 transform kernel to the N2×1 vector only once, rather than sequentially applying a N×N transform kernel to the row direction and column direction.

That is, the NSST may denote a non-separable square matrix applied to the vector consisting of the coefficients of a transform block. Further, although the description of the embodiments of the disclosure focuses on the NSST as an example of non-separable transform applied to the top-left area (low-frequency area) determined according to a block size, the embodiment of the disclosure are not limited to the term "NSST" but any types of non-separable transforms may rather be applied to the embodiments of the disclosure. For example, the non-separable transform applied to the top-left area (low-frequency area) determined according to the block size may be denoted as low frequency non-separable transform (LFNST). In the disclosure, M×N transform (or transform matrix) means a matrix consisting of M rows and N columns.

In the NSST, the two-dimension block data obtained by applying primary transform is split into M×M blocks, and then, M2×M2 non-separable transform is applied to each M×M block. M may be, e.g., 4 or 8. Rather than applying the NSST to all the areas in the two-dimension block obtained by the primary transform, the NSST may be applied to only some areas. For example, the NSST may be applied only to the top-left 8×8 block. Further, the 64×64 non-separable transform may be applied to the top-left 8×8 area only when the width and height of the two-dimension block obtained by the primary transform, both, are 8 or more, and the rest may be split into 4× blocks and the 16×16 non-separable transform may be applied to each of the 4×4 blocks.

The M2×M2 non-separable transform may be applied in the form of the matrix product, but, for reducing computation loads and memory requirements, be approximated to combinations of Givens rotation layers and permutation layers. FIG. 13 illustrates one Givens rotation. As shown in FIG. 13, it may be described with one angle of one Givens rotation.

FIG. 13 is a diagram illustrating Givens rotation according to an embodiment of the disclosure, and FIG. 14 illustrates a configuration of one round in a 4×4 NSST constituted of permutations and a Givens rotation layer according to an embodiment of the disclosure.

8×8 NSST and 4×4 NSST both may be configured of a hierarchical combination of Givens rotations. The matrix corresponding to one Givens rotation is as shown in Equation 1, and the matrix product may be expressed in diagram as shown in FIG. 13.

$$R_\theta = \begin{bmatrix} \cos\theta & -\sin\theta \\ \sin\theta & \cos\theta \end{bmatrix} \quad \text{[Equation 1]}$$

In FIG. 13, $t_m$ and $t_n$ output by Givens rotation may be calculated as Equation 2.

$$t_m = x_m\cos\theta - x_n\sin\theta \quad \text{[Equation 2]}$$

$$t_n = x_m\sin\theta + x_n\cos\theta$$

Since one Givens rotation rotates two pieces of data as shown in FIG. 13, 32 or 8 Givens rotations are needed to process 64 pieces of data (in the case of 8×8 NSST) or 16 pieces of data (in the case of 4×4 NSST), respectively. Thus, a bundle of 32 or 8 Givens rotations may form a Givens rotation layer. As shown in FIG. 14, output data for one Givens rotation layer is transferred as input data for the next Givens rotation layer through permotation (or shuffling). As shown in FIG. 14, the permutation pattern is regularly defined and, in the case of 4×4 NSST, four Givens rotation layers and their corresponding permutations form one round. 4×4 NSST is performed by two rounds, and 8×8 NSST is performed by four rounds. Although different rounds use the same permutation pattern, different Givens rotation angles are applied. Thus, it is needed to store the angle data for all the Givens rotations constituting each transform.

In the last step, final one more permutation is performed on the data output via the Givens rotation layers, and information for the permutation is separately stored per transform. The permutation is performed at the end of the forward NSST, and the inverse permutation is first applied to the inverse NSST.

The inverse NSST performs, in inverse order, the Givens rotation layers and the permutations applied to the forward NSST and takes a minus (−) value to the angle of each Givens rotation to rotate.

FIG. 15 illustrates an example configuration of non-split transform set per intra prediction mode according to an embodiment of the disclosure.

Intra prediction modes to which the same NSST or NSST set is applied my form a group. In FIG. 15, 67 intra prediction modes are classified into 35 groups. For example, the number 20 mode and the number 48 mode both belong to the number 20 group (hereinafter, mode group).

Per mode group, a plurality of NSSTs, rather than one NSST, may be configured into a set. Each set may include the case where no NSST is applied. For example, where three different NSSTs may be applied to one mode group, one of the four cases including the case where no NSST is applied may be selected. At this time, the index for differentiating one among the four cases may be transmitted in each TU. The number of NSSTs may be configured to differ per mode group. For example, the number 0 mode group and the number 1 mode group may be respectively signaled to select one of three cases including the case where no NSST is applied.

Embodiment 1: RST Applicable to 4×4 Blocks

The non-separable transform applicable to one 4×4 block is 16×16 transform. That is, if the data elements constituting the 4×4 block are sorted in a row in the row-first or column-first order, it becomes a 16×1 vector, and the non-separable transform may be applied to the 16×1 vector. The forward 16×16 transform consists of 16 row-direction transform basis vectors, and the inner product of the 16×1 vector and each transform basis vector leads to the transform coefficient for the transform basis vector. The process of obtaining the transform coefficients for all of the 16 transform basis vectors is to multiply the 16×16 non-separable transform matrix by the input 16×1 vector. The transform coefficients obtained by the matrix product have the form of a 16×1 vector, and the statistical characteristics may differ per transform coefficient. For example, if the 16×1 transform coefficient vector consists of the zeroth element to the 15th element, the variance of the zeroth element may be larger than the variance of the 15th element. That is, the more ahead the element is positioned, the larger variance the element has and thus a larger energy value.

If inverse 16×16 non-separable transform is applied from the 16×1 transform coefficient vector (when the effects of quantization or integerization are disregarded), the original 4×4 block signal may be reconstructed. If the forward 16×16 non-separable transform is an orthogonal transform, the inverse 16×16 transform may be obtained by transposing the matrix for the forward 16×16 transform. Simply speaking, data in the form of a 16×1 vector may be obtained by multiplying the inverse 16×16 non-separable transform matrix by the 16×1 transform coefficient vector and, if sorted in the row-first or column-first order as first applied, the 4×4 block signal may be reconstructed.

As set forth above, the elements of the 16×1 transform coefficient vector each may have different statistical characteristics. As in the above-described example, if the transform coefficients positioned ahead (close to the zeroth element) have larger energy, a signal significantly close to the original signal may be reconstructed by applying an inverse transform to some transform coefficients first appearing, even without the need for using all of the transform coefficients. For example, when the inverse 16×16 non-separable transform consists of 16 column basis vectors, only L column basis vectors are left to configure a 16×L matrix, and among the transform coefficients, only L transform coefficients which are more important are left (L×1 vector, this may first appear in the above-described example), and then the 16×L matrix and the L×1 vector are multiplied, thereby enabling reconstruction of the 16×1 vector which is not large in difference from the original 16×1 vector data. Resultantly, only L coefficients involve the data reconstruction. Thus, upon obtaining the transform coefficient, it is enough to obtain the L×1 transform coefficient vector, not the 16×1 transform coefficient vector. That is, L row direction transform vectors are picked from the forward 16×16 non-separable transform matrix to configure the L×16 transform, and is then multiplied with the 16×1 input vector, thereby obtaining the L main transform coefficients.

Embodiment 2: Configuring Application Area of 4×4 RST and Arrangement of Transform Coefficients 4×4 RST may be applied as the two-dimension transform and, at this time, may be secondarily applied to the block to which the primary transform, such as DCT-type 2, has been applied. When the size of the primary transform-applied block is N×N, it is typically larger than 4×4. Thus, the following two methods may be considered upon applying 4×4 RST to the N×N block.

4×4 RST may be applied to some areas of N×N area, rather than all the N×N area. For example, 4×4 RST may be applied only to the top-left M×M area (M<=N).

The area to which the secondary transform is to be applied may be split into 4×4 blocks, and 4×4 RST may be applied to each block.

Methods 1) and 2) may be mixed. For example, only the top-left M×M area may be split into 4×4 blocks and then 4×4 RST may be applied.

In a specific embodiment, the secondary transform may be applied only to the top-left 8×8 area. If the N×N block is equal to or larger than 8×8, 8×8 RS may be applied and, if the N×N block is smaller than 8×8 (4×4, 8×4, or 4×8), it may be split into 4×4 blocks and 4×4 RST may then be applied as in 2) above.

If L transform coefficients (1<=L<16) are generated after 4×4 RST is applied, a freedom arises as to how to arrange the L transform coefficients. However, since there may be a determined order upon reading and processing the transform coefficients in the residual coding part, coding performance may be varied depending on how to arrange the L transform coefficients in a two-dimensional block. In the high efficiency video coding (HEVC) standard, residual coding starts from the position farthest from the DC position, and this is for raising coding performance by using the fact that as positioned farther from the DC position, the coefficient value that has undergone quantization is 0 or close to 0. Thus, it may be advantageous in view of coding performance to place the coefficients of more critical and higher-energy out of the L transform coefficients later in a coding order.

FIG. 16 illustrates three forward scan orders on transform coefficients or a transform coefficient block applied in the HEVC standard, wherein (a) illustrates a diagonal scan, (b) illustrates a horizontal scan, and (c) illustrates a vertical scan.

FIG. 16 illustrates three forward scan orders for transform coefficients or a transform coefficient block (4×4 block, coefficient group (CG)) applied in the HEVC standard. Residual coding is performed in the inverse order of the scan order of (a), (b), or (c) (i.e., coded in the order from 16 to 1). The three scan orders shown in (a), (b), and (c) are selected according to the intra prediction mode. Thus, likewise for the L transform coefficients, the scan order may be determined according to the intra prediction mode.

L is subject to the range 1<=L<16. Generally, L transform basis vectors may be selected from 16 transform basis vectors by any method. However, it may be advantageous in view of encoding efficiency to select transform basis vectors with higher importance in energy aspect as in the above-proposed example in light of encoding and decoding.

FIG. 17 illustrates the position of the transform coefficients in a case a forward diagonal scan is applied when 4×4 RST is applied to a 4×8 block, according to an embodiment of the disclosure, and FIG. 18 illustrates an example of merging the valid transform coefficients of two 4×4 blocks into a single block according to an embodiment of the disclosure.

If, upon splitting the top-left 4×8 block into 4×4 blocks according to the diagonal scan order of (a) and applying 4×4 RST, L is 8 (i.e., if among the 16 transform coefficients, only eight transform coefficients are left), the transform coefficients may be positioned as shown in FIG. 17, where only half of each 4×4 block may have transform coefficients, and the positions marked with X may be filled with 0's as default. Thus, the L transform coefficients are arranged in each 4×4 block according to the scan order proposed in (a) and, under the assumption that the remaining (16-L) positions of each 4×4 block are filled with 0's, the residual coding (e.g., residual coding in HEVC) may be applied.

Further, the L transform coefficients which have been arranged in two 4×4 blocks as shown in FIG. 18 may be configured in one block. In particular, since one 4×4 block is fully filled with the transform coefficients of the two 4×4 blocks when L is 8, no transform coefficients are left in other blocks. Thus, since residual coding is not needed for the transform coefficient-empty 4×4 block, in the case of HEVC, the flag (coded_sub_block_flag) indicating whether residual coding is applied to the block may be coded with 0. There may be various schemes of combining the positions of the transform coefficients of the two 4×4 blocks. For example, the positions may be combined according to any order, and the following method may apply as well.

1) The transform coefficients of the two 4×4 blocks are combined alternately in scan order. That is, when the transform coefficient for the upper block is $$c_0^u, c_1^u, c_2^u, c_3^u, c_4^u, c_5^u, c_6^u, c_7^u,$$

and the transform coefficient of the lower block is $$c_0^l, c_1^l, c_2^l, c_3^l, c_4^l, c_5^l, c_6^l, c_7^l,$$

they may be combined alternately one by one like $$c_0^u, c_0^l, c_1^u, c_1^l, c_2^u, c_2^l, \ldots, c_7^u, c_7^l.$$

Further, $$c_\#^u \text{ and } c_\#^l$$

may be interchanged in order (i.e., $$c_\#^l$$

may come first).

2) The transform coefficients for the first 4×4 block may be arranged first and, then, the transform coefficients for the second 4×4 block may be arranged. That is, they may be connected and arranged like $$c_0^u, c_1^u, \ldots, c_7^u, c_0^l, c_1^l, \ldots, c_7^l.$$

Of course, order may be changed like $$c_0^l, c_1^l, \ldots, c_7^l, c_0^u, c_1^u, \ldots, c_7^u.$$

Embodiment 3: Method of Coding NSST (Non-Separable Secondary Transform) Index for 4×4 RST If 4×4 RST is applied as shown in FIG. 17, the L+1th position to the 16th position may be filled with 0 according to the transform coefficient scan order for each 4×4 block. Thus, if a non-zero value is present in the L+1th position to the 16th position in any one of the two 4×4 blocks, it is inferred that 4×4 RST is not applied. If 4×4 RST has the structure of applying the transform selected from the transform set prepared like joint exploration model (JEM) NSST, an index as to which transform is to be applied may be signaled.

In some decoder, the NSST index may be known via bitstream parsing, and bitstream parsing may be performed after residual decoding. In this case, if a non-zero transform coefficient is rendered to exist between the L+1th position and the 16th position by residual decoding, the decoder may refrain from parsing the NSST index because it is certain that 4×4 RST does not apply. Thus, signaling costs may be reduced by optionally parsing the NSST index only when necessary.

If 4×4 RST is applied to the plurality of 4×4 blocks in a specific area as shown in FIG. 17 (at this time, the same or different 4×4 RSTs may apply), (the same or different) 4×4 RST(s) applied to all of the 4×4 blocks may be designated via one NSST index. Since 4×4 RST, and whether 4×4 RST is applied, are determined for all the 4×4 blocks by one NSST index, if as a result of inspecting whether there is a non-zero transform coefficient in the L+1th position to the 16th position for all of the 4×4 blocks, a non-zero transform coefficient exists in a non-allowed position (the L+1th position to the 16th position) during the course of residual decoding, the encoding apparatus 100 may be configured not to code the NSST index.

The encoding apparatus 100 may separately signal the respective NSST indexes for a luminance block and a chrominance block, and respective separate NSST indexes may be signaled for the Cb component and the Cr component, and one common NSST index may be used in case of the chrominance block. Where one NSST index is used, signaling of the NSST index is also performed only once. Where one NSST index is shared for the Cb component and the Cr component, the 4×4 RST indicated by the same NSST index may be applied, and in this case the 4×4 RSTs for the Cb component and the Cr component may be the same or, despite the same NSST index, individual 4×4 RSTs may be set for the Cb component and the Cr component. Where the NSST index shared for the Cb component and the Cr component is used, it is checked whether a non-zero transform coefficient exists in the L+1th position to the sixth position for all of the 4×4 blocks of the Cb component and the Cr component and, if a non-zero transform coefficient is discovered in the L+1th position to the 16th position, signaling for NSST index may be skipped.

Even when the transform coefficients for two 4×4 blocks are merged into one 4×4 block as shown in FIG. 18, the encoding apparatus 100 may check if a non-zero transform coefficient appears in a position where no valid transform coefficient is to exist when 4×4 RST is applied and may then determine whether to signal the NSST index. In particular, where L is 8 and, thus, upon applying 4×4 RST, no valid transform coefficients exist in one 4×4 block as shown in FIG. 18 (the block marked with X in FIG. 18(*b*)), the flag (coded_sub_block_flag) as to whether to apply residual coding to the block may be checked and, if 1, the NSST index may not be signaled. As set forth above, although NSST is described below as an example non-separable transform, other known terms (e.g., LFNST) may be used for the non-separable transform. For example, NSST set and NSST index may be interchangeably used with LFNS set and LFNS index, respectively. Further, RST as described herein is an example of the non-separable transform (e.g., LFNST) that uses a non-square transform matrix with a reduced output length and/or a reduced input length in the square non-separable transform matrix applied to at least some area of the transform block (the top-left 4×4, 8×8 area or the rest except the bottom-right 4×4 area in the 8×8 block) and may be interchangeably used with LFNST.

Embodiment 4: Optimization Method in Case Where Coding on 4×4 Index is Performed Before Residual Coding Where coding for the NSST index is performed before residual coding, whether to apply 4×4 RST is previously determined. Thus, residual coding on the positions in which the transform coefficients are filled with 0's may be omitted. Here, whether to apply 4×4 RST may be determined via the NSST index (e.g., if the NSST index is 0, 4×4 RST does not apply) and, otherwise, whether to apply 4×4 RST may be signaled via a separate syntax element (e.g., NSST flag). For example, if the separate syntax element is the NSST flag, the decoding apparatus 200 first parses the NSST flag to thereby determine whether to apply 4×4 RST. Then, if the NSST flag is 1, residual coding (decoding) on the positions where no valid transform coefficient may exist may be omitted as described above.

In the case of HEVC, upon residual coding, coding is first performed in the last non-zero coefficient position in the TU. If coding on the NSST index is performed after coding on the last non-zero coefficient position, and the last non-zero coefficient position is a position where a non-zero coefficient cannot exist under the assumption that 4×4 RST is applied, the decoding apparatus 200 may be configured not to apply 4×4 RST without decoding the NSST index. For example, since in the positions marked with Xs in FIG. 17, no valid transform coefficients are positioned when 4×4 RST applies (which may be filled with 0's), if the last non-zero coefficient is positioned in the X-marked area, the decoding apparatus 200 may skip coding on the NSST index. If the last non-zero coefficient is not positioned in the X-marked area, the decoding apparatus 200 may perform coding on the NSST index.

If it is known whether to apply 4×4 RST by conditionally coding the NSST index after coding on the non-zero coefficient position, the rest residual coding may be processed in the following two schemes:

1) Where 4×4 RST is not applied, regular residual coding is performed. That is, coding is performed under the assumption that a non-zero transform coefficient may exist in any position from the last non-zero coefficient position to the DC.

2) Where 4×4 RST is applied, no transform coefficient exists on a specific position or specific 4×4 block (e.g., the X position in FIG. 17) (which is filled with 0 as default). Thus, residual coding on the position or block may be omitted. For example, upon arriving at the X-marked position while scanning according to the scan order of FIG. 17, coding on the flag (sig_coeff_flag) as to whether there is a non-zero coefficient in the position in the HEVC standard may be omitted. Where the transform coefficients of two blocks are merged into one block as shown in FIG. 18, coding on the flag (e.g., coded_sub_block_flag in the HEVC standard) indicating whether to apply residual coding on the 4×4 block filled with 0's may be omitted, and the value may be led to 0, and the 4×4 block may be filled with 0's without separate coding.

Where the NSST index is coded after coding on the last non-zero coefficient position, if the x position (Px) and y position (Py) of the last non-zero coefficient are smaller than Tx and Ty, respectively, coding on the NSST index is omitted, and no 4×4 RST may be applied. For example, if Tx=1, Ty=1, and the last non-zero coefficient is present in the DC position, NSST index coding is omitted. Such a scheme of determining whether to perform NSST index coding via comparison with a threshold may be differently applied to the luma component and chroma component. For example, different Tx and Ty may be applied to respective of the luma component and the chroma component, and a threshold may be applied to the luma component, but not to the chroma component. In contrast, a threshold may be applied to the chroma component but not to the luma component.

The above-described two methods may be applied simultaneously (if the last non-zero coefficient is positioned in the area where no valid transform coefficient exists, NSST index coding is omitted and, when the X and Y coordinates for the last non-zero coefficient each are smaller than the threshold, NSST index coding is omitted). For example, the threshold comparison for the position coordinates for the last non-zero coefficient is first identified and it may then be checked whether the last non-zero coefficient is positioned in the area where a valid transform coefficient does not exist, and the two methods may be interchanged in order.

The methods proposed in embodiment 4) may also apply to 8×8 RST. That is, if the last non-zero coefficient is positioned in the area which is not the top-left 4×4 in the top-left 8×8 area, NSST index coding may be omitted and, otherwise, NSST index coding may be performed. Further, if the X and Y coordinates for the position of the last non-zero coefficient both are less than a certain threshold, NSST index coding may be omitted. The two methods may be performed simultaneously.

Embodiment 5: Application of Different NSST Index Coding and Residual Coding to each of Luma Component and Chroma Component Upon RST Application The schemes described above in connection with embodiments 3 and 4 may be differently applied to the luma component and chroma component. That is, different NSST index coding and residual coding schemes may be applied to the luma component and chroma component. For example, the scheme described above in connection with embodiment 4 may be applied to the luma component, and the scheme described above in connection with embodiment 3 may be applied to the chroma component. Further, the conditional NSST index coding proposed in embodiment 3 or 4 may be applied to the luma component, and the conditional NSST index coding may not be applied to the luma component, and vice versa (the conditional NSST index coding applied to the chroma component but not to the luma component).

Embodiment 6

According to an embodiment of the disclosure, there are provided a mixed NSST transform set (MNTS) for applying various NSST conditions during the course of applying the NSST and a method of configuring the MNTS.

As per the JEM, the 4×4 NSST set includes only 4×4 kernel, and 8×8 NSST set includes only 8×8 kernel depending on the size of a preselected low block. According to an embodiment of the disclosure, there is also proposed a method of configuring a mixed NSST set as follows.

- The NSST set may include NSST kernels which are available in the NSST set and have one or more variable sizes, but not fixed size (e.g., 4×4 NSST kernel and 8×8 NSS kernel both are included in one NSST set).
- The number of NSST kernels available in the NSST set may be not fixed but varied (e.g., a first set includes three kernels, and a second set includes four kernels).
- The order of NSST kernels may be variable, rather than fixed, depending on the NSST set (e.g., in the first set, NSST kernels 1, 2, and 3 are mapped to NSST indexes 1, 2, and 3, respectively, but, in the second set, NSST kernels 3, 2, and 1 are mapped to NSST indexes 1, 2, and 3, respectively).

More specifically, the following is an example method of configuring a mixed NSST transform set.

- The priority of NSST kernels available in the NSST transform set may be determined depending on the NSST kernel size (e.g., 4×4 NSST and 8×8 NSST).

For example, if the block is large, the 8×8 NSST kernel may be more important than the 4×4 NSST kernel. Thus, an NSST index which is a small value is assigned to the 8×8 NSST kernel.

- The priority of NSST kernels available in the NSST transform set may be determined depending on the order of NSST kernels.

For example, a given 4×4 NSST first kernel may be prioritized over a 4×4 NSST second kernel.

Since the NSST index is encoded and transmitted, a higher priority (smaller index) may be allocated to the NSST kernel which is more frequent, so that the NSST index may be signaled with fewer bits.

Tables 1 and 2 below represent an example mixed NSST set proposed according to the instant embodiment.

TABLE 1

| NSST index | 4 × 4 NSST Set (JEM) | 8 × 8 NSST Set (JEM) | Mixed NSST Set (proposed) |
|---|---|---|---|
| 1 | 4 × 4 1st Kernel | 8 × 8 1st Kernel | 8 × 8 1st Kernel |
| 2 | 4 × 4 2nd Kernel | 8 × 8 2nd Kernel | 8 × 8 2nd Kernel |
| 3 | 4 × 4 3rd Kernel | 8 × 8 3rd Kernel | 4 × 4 1st Kernel |
| . . . | . . . | . . . | . . . |

TABLE 2

| NSST index | Mixed NSST Set Type1 | Mixed NSST Set Type2 | Mixed NSST Set Type3 |
|---|---|---|---|
| 1 | 8 × 8 3rd Kernel | 8 × 8 1st Kernel | 4 × 4 1st Kernel |
| 2 | 8 × 8 2nd Kernel | 8 × 8 2nd Kernel | 8 × 8 1st Kernel |
| 3 | 8 × 8 1st Kernel | 4 × 4 1st Kernel | 4 × 4 2nd Kernel |
| 4 | N.A | 4 × 4 2st Kernel | 8 × 8 2nd Kernel |
| 5 | | N.A | 4 × 4 3rd Kernel |
| . . . | | | . . . |

Embodiment 7

According to an embodiment of the disclosure, there is proposed a method of determining an NSST set considering block size and intra prediction mode during the course of determining a secondary transform set.

The method proposed in the instant embodiment configures a transform set suited for the intra prediction mode in association with embodiment 6, allowing various sizes of kernels to be configured and applied to blocks.

FIG. 19 illustrates an example method of configuring a mixed NSST set per intra prediction mode according to an embodiment of the disclosure.

FIG. 19 illustrates an example table according to applying the method proposed in embodiment 2 in association with embodiment 6. In other words, as shown in FIG. 19, there may be defined an index ('Mixed Type') indicating whether each intra prediction mode follows the legacy NSST set configuration method or other NSST set configuration method.

More specifically, in the case of the intra prediction mode where the index ('Mixed Type') of FIG. 19 is defined as '1,' the NSST set configuration method of the JEM is not followed but the NSST set configuration method defined in the system is used to configure the NSST set. Here, the NSST set configuration method defined in the system may mean the mixed NSST set proposed in embodiment 6.

As another embodiment, although two kinds of transform set configuration methods (JEM-based NSST set configuration and the mixed type NSST set configuration method proposed according to an embodiment of the disclosure) based on mixed type information (flag) related to intra prediction mode are described in connection with the table of FIG. 19, there may be one or more mixed type NSST configuration methods, and the mixed type information may be represented as N (N>2) various values.

In another embodiment, it may be determined whether to configure the transform set appropriate for the current block in a mixed type, considering the intra prediction mode and the transform block size both. For example, if the mode type corresponding to the intra prediction mode is 0, the NSST set configuration of the JEM is followed, otherwise (Mode Type==1), various mixed types of NSST sets may be determined depending on the transform block size.

FIG. 20 illustrates an example method of selecting an NSST set (or kernel) considering the size of transform block and an intra prediction mode according to an embodiment of the disclosure.

When the transform set is determined, the decoding apparatus 200 may determine the used NSST kernel using the NSST index information.

Embodiment 8

According to an embodiment of the disclosure, there is provided a method for efficiently encoding the NSST index considering a variation in statistical distribution of the NSST index transmitted after encoding, when the transform set is configured considering both the intra prediction mode and the block size during the course of applying the secondary transform. According to an embodiment of the disclosure, there is provided a method of selecting a kernel to be applied using the syntax indicating the kernel size.

According to an embodiment of the disclosure, there is also provided a truncated unary binarization method as shown in Table 3 as follows, depending on the maximum NSST index value available per set for efficient binarization since the number of available NSST kernels differs per transform set.

TABLE 3

| NSST Index | Binarization1 (Maximum index: 2) | Binarization2 (Maximum index: 3) | Binarization3 (Maximum index: 4) | Binarization4 (Maximum index: 5) | . . . |
|---|---|---|---|---|---|
| 0 | 0 | 0 | 0 | 0 | . . . |
| 1 | 10 | 10 | 10 | 10 | . . . |
| 2 | 11 | 110 | 110 | 110 | . . . |
| 3 | N.A | 111 | 1110 | 1110 | . . . |
| 4 | | N.A | 1111 | 11110 | . . . |
| 5 | | | N.A | 11111 | . . . |
| . . . | | | | N.A | . . . |

Table 3 represents binarization of the NSST index. Since the number of NSST kernels available differs per transform set, the NSST index may be binarized according to the maximum NSST index value.

Embodiment 9: Reduced Transform

There is provided a reduced transform applicable to core transforms (e.g., DCT or DST) and secondary transforms (e.g., NSST) due to complexity issues (e.g., large block transforms or non-separable transforms).

A main idea for the reduced transform is to map an N-dimensional vector to an R-dimensional vector in another space, where R/N (R<N> is a reduction factor. The reduced transform is an R×M matrix as expressed in Equation 3 below.

$$T_{R\times N} = \begin{bmatrix} t_{11} & \cdots & t_{1N} \\ \vdots & \ddots & \vdots \\ t_{R1} & \cdots & t_{RN} \end{bmatrix} \quad \text{[Equation 3]}$$

In Equation 1, the R rows of the transform are R bases in a new N-dimensional space. Hence, the reason why the reduced transform is so named is that the number of elements of the vector output by the transform is smaller than the number of elements of the vector input (R<N). The inverse transform matrix for the reduced transform is the transposition of a forward transform. The forward and inverse reduced transforms are described below with reference to FIGS. 21A and 21B.

FIGS. 21A and 21B illustrate forward and inverse reduced transform according to an embodiment of the disclosure.

The number of elements in the reduced transform is R×N which is R/N smaller than the size of the complete matrix (N×N), meaning that the required memory is R/N of the complete matrix.

Further, the number of products required is R×N which is R/N smaller than the original N×N.

If X is an N-dimensional vector, R coefficients are obtained after the reduced transform is applied, meaning that it is sufficient to transfer only R values instead of N coefficients as originally intended.

FIG. 22 is a flowchart illustrating an example of decoding using a reduced transform according to an embodiment of the disclosure.

The proposed reduced transform (inverse transform in the decoder) may be applied to coefficients (inversely quantized coefficients) as shown in FIG. 21. A predetermined reduction factor (R or R/N) and a transform kernel for performing the transform may be required. Here, the transform kernel may be determined based on available information, such as block size (width or height), intra prediction mode, or Cidx. If a current coding block is a luma block, Cldx is 0. Otherwise (Cb or Cr block), Cldx is a non-zero value, e.g., 1.

The operators used below in the disclosure are defined as shown in Tables 4 and 5.

TABLE 4

<table>
<tr><th colspan="2">Logical operators</th></tr>
<tr><td colspan="2">The following logical operators are defined as follows:</td></tr>
<tr><td>x && y</td><td>Boolean logical “and” of x and y.</td></tr>
<tr><td>x | | y</td><td>Boolean logical “or” of x and y.</td></tr>
<tr><td>!</td><td>Boolean logical “not”.</td></tr>
<tr><td>x ? y : z</td><td>If x is TRUE or not equal to 0, evaluates to the value of y; otherwise, evaluates to the value of z.</td></tr>
</table>

TABLE 5

| Relational operators | |
|---|---|
| The following relational operators are defined as follows: | |
| □ | Greater than. |
| □□ | Greater than or equal to. |
| □ | Less than. |
| □□ | Less than or equal to. |
| □ □ | Equal to. |
| !□ | Not equal to. |

FIG. 23 is a flowchart illustrating an example for applying conditional reduced transform according to an embodiment of the disclosure. The operations of FIG. 23 may be performed by the inverse quantizer 140 and the inverse transformer 150 of the decoding device 200.

According to an embodiment, the reduced transform may be used when a specific condition is met. For example, the reduced transform may be applied to blocks larger than a predetermined size as follows.

Width>TH && Height>HT (where TH is a predefined value (e.g., 4))

Or,

Width*Height>K && MIN (width, height)>TH (K and TH are predefined values)

That is, the reduced transform may be applied when the width of the current block is larger than the predefined value (TH), and the height of the current block is larger than the predefined value (TH) as in the above conditions. Or, the reduced transform may be applied when the product of the width and height of the current block is larger than the predetermined value (K), and the smaller of the width and height of the current block is larger than the predefined value (TH).

The reduced transform may be applied to a group of predetermined blocks as follows.

Width==TH && Height==TH

Or,

Width==Height

That is, if the width and height, each, of the current block is identical to the predetermined value (TH) or the width and height of the current block are identical (when the current block is a square block), the reduced transform may be applied.

Unless the conditions for using the reduced transform are met, regular transform may apply. The regular transform may be a transform predefined and available in the video coding system. Examples of the regular transform are as follows.

DCT-2, DCT-4, DCT-5, DCT-7, DCT-8

Or,

DST-1, DST-4, DST-7

Or, non-separable transform

Or,

JEM-NSST (HyGT)

As shown in FIG. 23, the reduced transform may rely on the index (Transform_idx) indicating which transform (e.g., DCT-4 or DST-1) is to be used or which kernel is to be applied (when a plurality of kernels are available). In particular, Transmission_idx may be transmitted two times. One is an index (Transform_idx_h) indicating horizontal transform, and the other is an index (Transform_idx_v) indicating vertical transform.

More specifically, referring to FIG. 23, the decoding apparatus 200 performs inverse quantization on an input bitstream (S2305). Thereafter, the decoding apparatus 200 determines whether to apply transform (S2310). The decoding apparatus 200 may determine whether to apply the transform via a flag indicating whether to skip the transform.

Where the transform applies, the decoding apparatus 200 parses the transform index (Transform_idx) indicating the transform to be applied (S2315). Or, the decoding apparatus 200 may select a transform kernel (S2330). For example, the decoding apparatus 200 may select the transform kernel corresponding to the transform index (Transform_idx). Further, the decoding apparatus 200 may select the transform kernel considering block size (width, height), intra prediction mode, or Cldx (luma, chroma).

The decoding apparatus 200 determines whether the conditions for applying the reduced transform is met (S2320). The conditions for applying the reduced transform may include the above-described conditions. When the reduced transform is not applied, the decoding apparatus 200 may apply regular inverse transform (S2325). For example, in step S2330, the decoding apparatus 200 may determine the inverse transform matrix from the selected transform kernel and may apply the determined inverse transform matrix to the current block including transform coefficients.

When the reduced transform is applied, the decoding apparatus 200 may apply reduced inverse transform (S2335). For example, in step S2330, the decoding apparatus 200 may determine the reduced inverse transform matrix from the selected transform kernel considering the reduction factor and may apply the reduced inverse transform matrix to the current block including transform coefficients.

FIG. 24 is a flowchart illustrating an example of decoding for secondary inverse-transform to which conditional reduced transform applies, according to an embodiment of the disclosure. The operations of FIG. 24 may be performed by the inverse transformer 230 of the decoding device 200.

According to an embodiment, the reduced transform may be applied to the secondary transform as shown in FIG. 24. If the NSST index is parsed, the reduced transform may be applied.

Referring to FIG. 24, the decoding apparatus 200 performs inverse quantization (S2405). The decoding apparatus 200 determines whether to apply the NSST to the transform coefficients generated via the inverse quantization (S2410). That is, the decoding apparatus 200 determines whether it is needed to parse the NSST index (NSST_indx) depending on whether to apply the NSST.

When the NSST is applied, the decoding apparatus 200 parses the NSST index (S2415) and determines whether the NSST index is larger than 0 (S2420). The NSST index may be reconstructed via such a scheme as CABAC, by the entropy decoder 210. When the NSST index is 0, the decoding apparatus 200 may omit secondary inverse transform and apply core inverse transform or primary inverse transform (S2445).

Further, when the NSST is applied, the decoding apparatus 200 selects a transform kernel for the secondary inverse transform (S2435). For example, the decoding apparatus 200 may select the transform kernel corresponding to the NSST index (NSST_idx). Further, the decoding apparatus 200 may select the transform kernel considering block size (width, height), intra prediction mode, or Cldx (luma, chroma).

When the NSST index is larger than 0, the decoding apparatus 200 determines whether the condition for applying the reduced transform is met (S2425). The condition for applying the reduced transform may include the above-described conditions. When the reduced transform is not applied, the decoding apparatus 200 may apply regular secondary inverse transform (S2430). For example, in step S2435, the decoding apparatus 200 may determine the secondary inverse transform matrix from the selected transform kernel and may apply the determined secondary inverse transform matrix to the current block including transform coefficients.

When the reduced transform is applied, the decoding apparatus 200 may apply reduced secondary inverse transform (S2440). For example, in step S2335, the decoding apparatus 200 may determine the reduced inverse transform matrix from the selected transform kernel considering the reduction factor and may apply the reduced inverse transform matrix to the current block including transform coefficients. Thereafter, the decoding apparatus 200 applies core inverse transform or primary inverse transform (S2445).

Embodiment 10: Reduced Transform as a Secondary Transform with Different Block Size FIGS. 25A, 25B, 26A, and 26B illustrate examples of reduced transform and reduced inverse-transform according to an embodiment of the disclosure.

According to an embodiment of the disclosure, the reduced transform may be used as the secondary transform and secondary inverse transform in the video codec for different block sizes, such as 4×4, 8×8, or 16×16. As an example for the 8×8 block size and reduction factor R=16, the secondary transform and secondary inverse transform may be set as shown in FIGS. 25A and 25B.

The pseudocode of the reduced transform and reduced inverse transform may be set as shown in FIG. 26.

Embodiment 11: Reduced Transform as a Secondary Transform with Non-Rectangular Shape FIG. 27 illustrates an example area to which reduced secondary transform applies according to an embodiment of the disclosure.

As described above, the secondary transform may be applied to the 4×4 and 8×8 corners due to complexity issues. The reduced transform may be applied to non-square shapes.

As shown in FIG. 27, the RST may be applied only to some area (hatched area) of the block. In FIG. 27, each square represents a 4×4 area, and the RST may be applied to 10 4×4 pixels (i.e., 160 pixels). Where reduction factor R=16, the whole RST matrix is a 16×16 matrix, and this may be the amount of computation that is acceptable.

In another example, in the case that the RST is applied to a 8×8 block, non-separable transform (RST) may be applied only to the remaining top-left, top-right and bottom-left three 4×4 blocks (total 48 transform coefficients) except bottom-right 4×4 block.

Embodiment 12: Reduction Factor

FIG. 28 illustrates reduced transform according to a reduced factor according to an embodiment of the disclosure.

A change in the reduction factor may lead to a variation in memory and multiplication complexity. As described above, the memory and multiplication complexity may be reduced by the factor R/N owing to the change to the reduction factor. For example, where R=16 for the 8×8 NSST, the memory and multiplication complexity may be reduced by ¼.

Embodiment 13: High Level Syntax

The syntax elements as represented in Table 6 below may be used for processing RST in video coding. The semantics related to reduced transform may be present in s sequence parameter set (SPS) or a slice header.

Reduced_transform_enabled_flag being 1 represents that the reduced transform is possible and applied. Reduced_transform_enabled_flag being 0 represents that the reduced is not transform possible. When Reduced_transform_enabled_flag does not exist, it is inferred to be 0. (Reduced_transform_enabled_flag equals to 1 specifies that reduced transform is enabled and applied. Reduced_transform_enabled_flag equal to 0 specifies that reduced transform is not enabled. When Reduced_transform_enabled_flag is not present, it is inferred to be equal to 0).

Reduced_transform_factor indicates the number of reduced dimensions to be maintained for the reduced transform. Reduced_transform_factor being absent, it is inferred to be identical to R. (Reduced_transform_factor specifies that the number of reduced dimensions to keep for reduced transform. When Reduced_transform_factor is not present, it is inferred to be equal to R).

min_reduced_transform_size indicates the minimum transform size to apply the reduced transform. min_reduced_transform_size being absent, it is inferred to be 0. (min_reduced_transform_size specifies that the minimum transform size to apply reduced transform. When min_reduced_transform_size is not present, it is inferred to be equal to 0).

max_reduced_transform_size indicates the maximum transform size to apply the reduced transform. max_reduced_transform_size being absent, it is inferred to be 0.

reduced_transform_factor indicates the number of reduced dimensions to be maintained for the reduced transform. reduced_transform_size being absent, it is inferred to be 0. (reduced_transform_size specifies that the number of reduced dimensions to keep for reduced transform. When Reduced_transform_factor is not present, it is inferred to be equal to 0.)

TABLE 6

| | Descriptor |
|---|---|
| seq_parameter_set_rbsp( ) { | |
| sps_video_parameter_set_id | u(4) |
| sps_max_sub_layers_minus1 | u(3) |
| sps_temporal_id_nesting_flag | u(1) |
| profile_tier_level( sps_max_sub_layers_minus1 ) | |
| sps_seq_parameter_set_id | ue(v) |

TABLE 6-continued

| | Descriptor |
|---|---|
| chroma_format_idc | ue(v) |
| if( chroma_format_idc = = 3) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| ... | |
| Reduced_transform_enabled_flag | u(1) |
| If(reduced_transform_enabled_flag) { | |
| reduced_transform_factor | ue(v) |
| min_reduced_transform_size | ue(v) |
| max_reduced_transform_size | ue(v) |
| reduced_transform_size | ue(v) |
| } | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

Embodiment 14: Conditional Application of 4×4 RST for Worst Case Handling

The non-separable secondary transform (4×4 NSST) applicable to a 4×4 block is 16×16 transform. The 4×4 NSST is secondarily applied to the block that has undergone the primary transform, such as DCT-2, DST-7, or DCT-8. When the size of the primary transform-applied block is N×M, the following method may be considered upon applying the 4×4 NSST to the N×M block.

1) The following are conditions a) and b) to apply the 4×4 NSST to the N×M area.

a) N>=4 b) M>=4

2) 4×4 NSST may be applied to some, rather than all, N×M areas. For example, the 4×4 NSST may be applied only to the top-left K×J area. a) and b) below are conditions for this case.

a) K>=4 b) J>=4

3) The area to which the secondary transform is to be applied may be split into 4×4 blocks, and 4×4 NSST may be applied to each block.

The computation complexity of the 4×4 NSST is a very critical consideration for the encoder and decoder, and this is thus analyzed in detail. In particular, the computational complexity of the 4×4 NSST is analyzed based on the multiplication count. In the case of forward NSST, the 16×16 secondary transform consists of 16 row directional transform basis vectors, and the inner product of the 16×1 vector and each transform basis vector leads to a transform coefficient for the transform basis vector. The process of obtaining all the transform coefficients for the 16 transform basis vectors is to multiply the 16×16 non-separable transform matrix by the input 16×1 vector. Thus, the total multiplication count required for the 4×4 forward NSST is 256.

When inverse 16×16 non-separable transform is applied to the 16×1 transform coefficient in the decoder (when such effects as those of quantization and integerization are disregarded), the coefficients of original 4×4 primary transform block may be reconstructed. In other words, data in the form of a 16×1 vector may be obtained by multiplying the inverse 16×16 non-separable transform matrix by the 16×1 transform coefficient vector and, if data is sorted in the row-first or column-first order as first applied, the 4×4 block signal (primary transform coefficient) may be reconstructed. Thus, the total multiplication count required for the 4×4 inverse NSST is 256.

As described above, when the 4×4 NSST is applied, the multiplication count required per sample unit is 16. This is the number obtained when dividing the total multiplication count, 256, which is obtained during the course of the inner product of each transform basis vector and the 16×1 vector by the total number, 16, of samples, which is the process of performing the 4×4 NSST. The multiplication count required for both the forward 4×4 NSST and the inverse 4×4 NSST is 16.

In the case of an 8×8 block, the multiplication count per sample required upon applying the 4×4 NSST is determined depending on the area where the 4×4 NSST has been applied.

1. Where 4×4 NSST is applied only to a top-left 4×4 area: 256 (multiplication count necessary for 4×4 NSST process)/64 (total sample count in 8×8 block)=4 multiplication count/samples 2. Where 4×4 NSST is applied to top-left 4×4 area and top-right 4×4 area: 512 (multiplication count necessary for two 4×4 NSSTs)/64 (total sample count in 8×8 block)=8 multiplication count/samples 3. Where 4×4 NSST is applied to all 4×4 areas in 8×8 block: 1024 (multiplication count necessary for four 4×4 NSSTs)/64 (total sample count in 8×8 block)=16 multiplication count/samples As described above, if the block size is large, the range of applying the 4×4 NSST may be reduced in order to reduce the multiplication count in the worst scenario case required at each sample end.

Thus, if the 4×4 NSST is used, the worst scenario case arises when the TU size is 4×4. In this case, the following methods may reduce the worst case complexity.

Method 1. Do not apply 4×4 NSST to smaller TUs (i.e., 4×4 TUs).

Method 2. Apply 4×4 RST, rather than 4×4 NSST, to 4×4 blocks (4×4 TUs).

It was experimentally observed that method 1 caused significant deterioration of encoding performance as it does not apply 4×4 NSST. It was revealed that method 2 was able to reconstruct a signal very close to the original signal by applying inverse transform to some transform coefficients positioned ahead even without using all the transform coefficients in light of the statistical characteristics of the elements of the 16×1 transform coefficient vector and was thus able to maintain most of the encoding performance.

Specifically, in the case of 4×4 RST, when inverse (or forward) 16×16 non-separable transform consists of 16 column basis vectors, only L column basis vectors are left, and a 16×L matrix is configured. As L more critical transform coefficients alone are left among the transform coefficients, the product of the 16×L matrix and the L×1 vector may lead to reconstruction of the 16×1 vector which makes little difference from the original 16×1 vector data.

Resultantly, only L coefficients involve the data reconstruction. Thus, to obtain the transform coefficient, it is enough to obtain the L×1 transform coefficient vector, not the 16×1 transform coefficient vector. That is, the L×16 transform matrix is configured by selecting L row direction transform vectors from the forward 16×16 non-separable transform matrix, and L transform coefficients are obtained by multiplying the L×16 transform matrix by a 16×1 input vector.

L is subject to the range 1<=L<16. Generally, L transform basis vectors may be selected from 16 transform basis vectors by any method. However, it may be advantageous in view of encoding efficiency to select transform basis vectors with higher importance in signal energy aspect in light of encoding and decoding as described above. The per-sample worst case multiplication count in the 4×4 block according to a transform on the L value is as shown in Table 7 below.

TABLE 7

| L | total Multiplication | per-pixel Multiplication |
|---|---|---|
| 16 | 256 | 16 |
| 8 | 128 | 8 |
| 4 | 64 | 4 |
| 2 | 32 | 2 |

As described above, the 4×4 NSST and the 4×4 RST may be comprehensively used as shown in Table 8 below so as to reduce the worst case multiplication complexity. (however, the following example describes the conditions for applying the 4×4 NSST and the 4×4 RST under the conditions for applying the 4×4 NSST (that is, when the width and height, both, of the current block are equal to or larger than 4).

As described above, the 4×4 NSST for the 4×4 block is a square (16×16) transform matrix that receives 16 pieces of data and outputs 16 pieces of data, and the 4×4 RST means a non-square (8×16) transform matrix that receives 16 pieces of data and outputs R (e.g., eight) pieces of data, which are fewer than 16, with respect to the encoder side. The 4×4 RST means a non-square (16×8) transform matrix that receives R (e.g., eight) pieces of data, which are fewer than 16, and outputs 16 pieces of data with respect to the decoder side.

TABLE 8

```
If (block width == 4 and block height == 4)
Apply 4x4 RST based on 8x16 matrix
Else
Apply 4x4 NSST for Top-left 4x4 region
```

Referring to Table 8, when the width and height of the current block are 4, the 8×16 matrix-based 4×4 RST is applied to the current block, otherwise (if either the width or height of the current block is not 4), the 4×4 NSST may be applied to the top-left 4×4 area of the current block. More specifically, if the size of the current block is 4×4, non-separable transform with an input length of 16 and an output length of 8 may be applied. In the case of inverse non-separable transform, non-separable transform with an input length of 8 and an output length of 16 may be applied.

As described above, the 4×4 NSST and the 4×4 RST may be used in combination as shown in Table 9 below so as to reduce the worst case multiplication complexity. (however, the following example describes the conditions for applying the 4×4 NSST and the 4×4 RST under the conditions for applying the 4×4 NSST (that is, when the width and height, both, of the current block are equal to or larger than 4)).

TABLE 9

```
If (block width == 4 and block height == 4)
  Apply 4x4 RST based on 8x16 matrix
Else if (block width X block height < TH)    (TH is predefined value
such as 64)
  Apply 4x4 NSST for Top-left 4x4 region
Else if (block width >= block height)
  Apply 4x4 NSST for Top-left 4x4 region and the very right 4x4 region
of Top-left 4x4 region
Else
  Apply 4x4 NSST for Top-left 4x4 region and and the very below 4x4
region of Top-left 4x4 region
```

Referring to Table 9, when the width and height of the current block each are 4, the 8×16 matrix-based 4×4 RST is applied and, if the product of the width and height of the current block is smaller than the threshold (TH), the 4×4 NSST is applied to the top-left 4×4 area of the current block and, if the width of the current block is equal to or larger than the height, the 4×4 NSST is applied to the top-left 4×4 area of the current block and the 4×4 area positioned to the right of the top-left 4×4 area, and for the rest (when the product of the width and height of the current block is equal to or larger than the threshold and the width of the current block is smaller than the height), the 4×4 NSST is applied to the top-left 4×4 area of the current block and the 4×4 area positioned under the top-left 4×4 area.

Resultantly, the 4×4 RST (e.g., 8×16 matrix), instead of the 4×4 NSST, may be applied to the 4×4 block to reduce the computational complexity of the worst case multiplication.

Embodiment 15: Conditional Application of 8×8 RST for Worst Case Handling

The non-separable secondary transform (8×8 NSST) applicable to one 8×8 block is a 64×64 transform. The 8×8 NSST is secondarily applied to the block that has undergone the primary transform, such as DCT-2, DST-7, or DCT-8. When the size of the primary transform-applied block is N×M, the following method may be considered upon applying the 8×8 NSST to the N×M block.

1) The following are conditions c) and d) to apply the 8×8 NSST to the N×M area.

c) N>=8 d) M>=8

2) 8×8 NSST may be applied to some, rather than all, N×M areas. For example, the 8×8 NSST may be applied only to the top-left K×J area. c) and d) below are conditions for this case.

c) K>=8 d) J>=8

3) The area to which the secondary transform is to be applied may be split into 8×8 blocks, and 8×8 NSST may be applied to each block.

The computation complexity of the 8×8 NSST is a very critical consideration for the encoder and decoder, and this is thus analyzed in detail. In particular, the computational complexity of the 8×8 NSST is analyzed based on the multiplication count. In the case of forward NSST, the 64×64 secondary transform consists of 64 row direction transform basis vectors, and the inner product of the 64×1 vector and each transform basis vector leads to a transform coefficient for the transform basis vector. The process of obtaining all the transform coefficients for the 64 transform basis vectors is to multiply the 64×64 non-separable transform matrix by the input 64×1 vector. Thus, the total multiplication count required for the 8×8 forward NSST is 4,096.

When the inverse 64×64 non-separable transform is applied to the 64×1 transform coefficient in the decoder (when such effects as those of quantization and integerization are disregarded), the coefficient of original 8×8 primary transform block may be reconstructed. In other words, data in the form of a 64×1 vector may be obtained by multiplying the inverse 64×64 non-separable transform matrix by the 64×1 transform coefficient vector and, if data is sorted in the row-first or column-first order as first applied, the 8×8 block signal (primary transform coefficient) may be reconstructed. Thus, the total multiplication count required for the 8×8 inverse NSST is 4,096.

As described above, when the 8×8 NSST is applied, the multiplication count required per sample unit is 64. This is the number obtained when dividing the total multiplication count, 4,096, which is obtained during the course of the inner product of each transform basis vector and the 64×1 vector by the total number, 64, of samples, which is the process of performing the 8×8 NSST. The multiplication count required for both the forward 8×8 NSST and the inverse 8×8 NSST is 64.

In the case of a 16×16 block, the multiplication count per sample required upon applying the 8×8 NSST is determined depending on the area where the 8×8 NSST has been applied.

1. Where 8×8 NSST is applied only to top-left 8×8 area: 4096 (multiplication count necessary for 8×8 NSST process)/256 (total sample count in 16×16 block)=16 multiplication count/samples 2. Where 8×8 NSST is applied to top-left 8×8 area and top-right 8×8 area: 8192 (multiplication count necessary for two 8×8 NSSTs)/256 (total sample count in 16×16 block)=32 multiplication count/samples 3. Where 8×8 NSST is applied to all 8×8 areas in 16×16 block: 16384 (multiplication count necessary for four 8×8 NSSTs)/256 (total sample count in 16×16 block)=64 multiplication count/samples As described above, if the block size is large, the range of applying the 8×8 NSST to reduce the multiplication count in the worst scenario case required per sample end may be reduced.

Where the 8×8 NSST applies, since the 8×8 block is the smallest TU to which the 8×8 NSST is applicable, the case where the TU size is 8×8 is the worst case in light of the multiplication count required per sample. In this case, the following methods may reduce the worst case complexity.

Method 1. Do not apply 8×8 NSST to smaller TUs (i.e., 8×8 TUs).

Method 2. Apply 8×8 RST, rather than 8×8 NSST, to 8×8 blocks (8×8 TUs).

It was experimentally observed that method 1 caused significant deterioration of encoding performance as it does not apply 8×8 NSST. It was revealed that method 2 was able to reconstruct a signal very close to the original signal by applying an inverse transform to some transform coefficients positioned ahead even without using all the transform coefficients in light of the statistical characteristics of the elements of the 64×1 transform coefficient vector and was thus able to maintain most of the encoding performance.

Specifically, in the case of 8×8 RST, when the inverse (or forward) 64×64 non-separable transform consists of 16 column basis vectors, only L column basis vectors are left, and the 64×L matrix is configured. As L more critical transform coefficients alone are left among the transform coefficients, the product of the 64×L matrix and the L×1 vector may lead to reconstruction of the 64×1 vector which makes little difference from the original 64×1 vector data.

In addition, as described in embodiment 11, the RST may not be applied to all of 64 transform coefficients included in 8×8 block, but the RST may be applied a partial area (e.g., the remaining area except bottom right 4×4 area of the 8×8 block).

Resultantly, only L coefficients involve the data reconstruction. Thus, to obtain the transform coefficient, it is enough to obtain the L×1 transform coefficient vector, not the 64×1 transform coefficient vector. That is, the L×64 transform matrix is configured by selecting L row direction transform vectors from the forward 64×64 non-separable transform matrix, and L transform coefficients are obtained by multiplying the L×64 transform matrix by the 64×1 input vector.

L value may have the range of 1<=L<64, and generally, and L vectors may be selected among 64 transform basis vectors in an arbitrary method, but it may be beneficial in the aspect of encoding efficiency to select the transform basis vectors having high energy importance of signal in encoding and decoding aspect as described above. The number of multiplications required per sample in an 8×8 block depending on a variation of L value in the worst case is as represented in Table 10 below.

TABLE 10

| L | total Multiplication | per-pixel Multiplication |
|---|---|---|
| 64 | 4096 | 64 |
| 32 | 2048 | 32 |
| 16 | 1024 | 16 |
| 8 | 512 | 8 |
| 4 | 256 | 4 |

As described above, the 8×8 RSTs with different L values may be comprehensively used as shown in Table 11 below so as to reduce the worst case multiplication complexity. (however, the following example describes the conditions for applying the 8×8 RST under the conditions for applying the 8×8 NSST (that is, when the width and height, both, of the current block are equal to or larger than 8)).

TABLE 11

```
If (block width == 8 and block height == 8)
  Apply 8×8 RST based on 8×64 matrix (where L is 8)
Else
  Apply 8×8 RST based on 16×64 matrix (where L is 16)
```

Referring to Table 11, when the width and height, each, of the current block are 8, the 8×64 matrix-based 8×8 RST is applied to the current block, otherwise (if either the width or height of the current block is not 8), the 16×64 matrix-based 8×8 RST may be applied to the current block. More specifically, when the size of the current block is 8×8, the non-separable transform with an input length of 64 and an output length of 8 may be applied, otherwise a non-separable transform with an input length of 64 and an output length of 16 may be applied. In the case of the inverse non-separable transform, when the current block is 8×8, the non-separable transform with an input length of 8 and an output length of 64 may be applied, otherwise a non-separable transform with an input length of 16 and an output length of 64 may be applied.

In addition, as described in embodiment 11, since the RST may be applied only to a partial area, not to the entire 8×8 block, for example, in the case that the RST is applied to the remaining area except bottom right 4×4 area of the 8×8 block, 8×8 RST based on 8×48 or 16×18 matrix may be applied. That is, in the case that each of a width and a height corresponds to 8, 8×8 RST based on 8×48 matrix may be applied, and otherwise (in the case that a width and a height of a current block is not 8), 8×8 RST based on 16×48 matrix may be applied.

For a forward direction non-separable transform, in the case that the current block is 8×8, the non-separable transform having an input length of 48 and an output length of 8 may be applied, and otherwise, the non-separable transform having an input length of 48 and an output length of 16 may be applied.

For a backward direction non-separable transform, in the case that the current block is 8×8, the non-separable transform having an input length of 8 and an output length of 48 may be applied, and otherwise, the non-separable transform having an input length of 16 and an output length of 48 may be applied.

Consequently, in the case that the RST is applied to a block larger than 8×8, based on an encoder side, in the case that each of a width and a height of a block corresponds to 8, a non-separable transform matrix (8×48 or 8×64 matrix) having an input length of 64 or smaller (e.g., 48 or 64) and an output length smaller than 64 (e.g., 8) may be applied. In the case that a width or a height of a block does not correspond to 8, a non-separable transform matrix (16×48 or 16×64 matrix) having an input length of 64 or smaller (e.g., 48 or 64) and an output length smaller than 64 (e.g., 16) may be applied.

In addition, in the case that the RST is applied to a block larger than 8×8, based on a decoder side, in the case that each of a width and a height of a block corresponds to 8, a non-separable transform matrix (48×8 or 64×8 matrix) having an input length smaller than 64 (e.g., 8) and an output length of 64 or smaller (e.g., 48 or 64) may be applied. In the case that a width or a height of a block does not correspond to 8, a non-separable transform matrix (48×16 or 64×16 matrix) having an input length smaller than 64 (e.g., 16) and an output length of 64 or smaller (e.g., 48 or 64) may be applied.

Table 12 represents an example of various 8×8 RST applications under the condition for applying 8×8 NSST (i.e., the case that a width and a height of a block is greater than or equal to 8).

TABLE 12

```
If (block width == 8 and block height == 8)
  Apply 8x8 RST based on 8x64 matrix
Else if (block width X block height < TH) (TH is predefined value
such as 256)
  Apply 8x8 RST based on 16x64 matrix for Top-left 8x8 region
Else
  Apply 8x8 RST based on 32x64 matrix for Top-left 8x8 region
```

Referring to Table 12, in the case that each of a width and a height of the current block is 8, 8×8 RST based on 8×64 matrix (or 8×48 matrix) is applied, in the case that a multiplication of a width and a height of the current block is smaller than a threshold value (TH), 8×8 RST based on 16×64 matrix (or 16×48 matrix) is applied to a top-left 8×8 area of the current block, and otherwise (in the case that a width or a height of the current block is not 8 and a multiplication of a width and a height of the current block is greater than or equal to a threshold value), 8×8 RST based on 32'64 matrix (or 32×48 matrix) is applied to a top-left 8×8 area.

FIG. 29 illustrates an example of encoding flowchart performing transform as an embodiment to which the present disclosure is applied.

The encoding apparatus 100 performs primary transform for a residual block (step, S2910). The primary transform may also be referred to as core transform. As an embodiment, the encoding apparatus 100 may perform the primary transform by using the MTS described above. In addition, the encoding apparatus 100 may transmit an MTS index indicating a specific MTS among MTS candidates to the decoding apparatus 200. In this case, the MTS candidates may be constructed based on an intra prediction mode of the current block.

The encoding apparatus 100 determines whether to apply secondary transform (step, S2920). As an example, the encoding apparatus 100 may determine whether to apply the secondary transform based on residual transform coefficients according to the primary transform. For example, the secondary transform may be NSST or RST.

The encoding apparatus 100 determines to perform the secondary transform (step, S2930). In this case, the encoding apparatus 100 may determine to perform the secondary transform based on a NSST (or RST) transform set designated according to an intra prediction mode.

In addition, as an example, before step S2930, the encoding apparatus 100 may determine an area to which the secondary transform is applied based on a size of the current block.

The encoding apparatus 100 performs the secondary transform by using the secondary transform determined in step S2930 (step S2940).

FIG. 30 illustrates an example of decoding flowchart performing transform as an embodiment to which the present disclosure is applied.

The decoding apparatus 200 determines whether to apply secondary inverse transform (step, S3010). For example, the secondary inverse transform may be NSST or RST. As an example, the decoding apparatus 200 may determine whether to apply the secondary inverse transform based on a secondary transform flag received from the encoding apparatus 100.

The decoding apparatus 200 determines to perform the secondary inverse transform (step, S3020). In this case, the decoding apparatus 200 may determine to perform the secondary inverse transform applied to the current block based on a NSST (or RST) transform set designated according to the intra prediction mode described above.

In addition, as an example, before step S3020, the decoding apparatus 200 may determine an area to which the secondary inverse transform is applied based on a size of the current block.

The decoding apparatus 200 performs the secondary inverse transform for a dequantized residual block by using the secondary inverse transform determined in step S3020 (step, S3030).

The decoding apparatus 200 performs primary inverse transform for the residual block in which secondary inverse transform is performed. The primary inverse transform may be referred to as core inverse transform. As an embodiment, the decoding apparatus 200 may perform the primary inverse transform by using the MTS described above. In addition, as an example, before step S3040, the decoding apparatus 200 may determine whether the MTS is applied to the current block. In this case, a step of determining whether the MTS is applied may be further included in the decoding flowchart of FIG. 30.

As an example, in the case that the MTS is applied to the current block (i.e., cu_mts_flag=1), the decoding apparatus 200 may construct the MTS candidates based on the intra prediction mode of the current block. In this case, a step of constructing the MTS candidates may be further included in the decoding flowchart of FIG. 30. Furthermore, the decoding apparatus 200 may determine whether to perform the primary inverse transform applied to the current block by using mts_idx that indicates a specific MTS among the constructed MTS candidates.

FIG. 31 illustrates an example of detailed block diagram of a transformer 120 in the encoding apparatus 100 as an embodiment to which the present disclosure is applied.

The encoding apparatus 100 to which as an embodiment of the present disclosure is applied may include a primary transformer 3110, a secondary transform application determination unit 3120, a secondary transform determination unit 3130 and a secondary transformer 3140.

The primary transformer 3110 may perform primary transform for a residual block. The primary transform may also be referred to as core transform. As an embodiment, the primary transformer 3110 may perform the primary transform by using the MTS described above. In addition, the primary transformer 3110 may transmit an MTS index indicating a specific MTS among MTS candidates to the decoding apparatus 200. In this case, the MTS candidates may be constructed based on an intra prediction mode of the current block.

The secondary transform application determination unit 3120 determines secondary transform. As an example, the secondary transform application determination unit 3120 may determine whether to apply the secondary transform based on a residual transform coefficient according to the primary transform. For example, the secondary transform may be NSST or RST.

The secondary transform determination unit 3130 determines to perform the secondary transform. In this case, the secondary transform determination unit 3130 may determine to perform the secondary transform based on a NSST (or RST) transform set designated according to an intra prediction mode.

In addition, as an example, the secondary transform determination unit 3130 may determine an area to which the secondary transform is applied based on a size of the current block.

The secondary transformer 3140 may perform the secondary transform by using the secondary transform which is determined.

FIG. 32 illustrates an example of detailed block diagram of the inverse transformer 230 in the decoding apparatus as an embodiment to which the present disclosure is applied.

The decoding apparatus 200 to which the present disclosure is applied includes a secondary inverse transform application determination unit 3210, a secondary inverse transform determination unit 3220, a secondary inverse transformer 3230 and a primary inverse transformer 3240.

The secondary inverse transform application determination unit 3210 determines whether to apply secondary inverse transform. For example, the secondary inverse transform may be NSST or RST. As an example, the secondary inverse transform application determination unit 3210 may determine whether to apply the secondary inverse transform based on a secondary transform flag received from the encoding apparatus 100. As another example, the secondary inverse transform application determination unit 3210 may also determine whether to apply the secondary inverse transform based on transform coefficients of the residual block.

The secondary inverse transform determination unit 3220 may determine the secondary inverse transform. In this case, the secondary inverse transform determination unit 3220 may determine to perform the secondary inverse transform applied to the current block based on a NSST (or RST) transform set designated according to the intra prediction mode described above.

In addition, as an example, the secondary inverse transform determination unit 3220 may determine an area to which the secondary inverse transform is applied based on a size of the current block.

Furthermore, as an example, the secondary inverse transformer 3230 may perform secondary inverse transform for dequantized residual block by using the secondary inverse transform which is determined.

The primary inverse transformer 3240 may perform primary inverse transform for the residual block in which secondary inverse transform is performed. As an embodiment, the primary inverse transformer 3240 may perform the primary inverse transform by using the MTS described above. In addition, as an example, the primary inverse transformer 3240 may determine whether the MTS is applied to the current block.

As an example, in the case that the MTS is applied to the current block (i.e., cu_mts_flag=1), the primary inverse transformer 3240 may construct the MTS candidates based on the intra prediction mode of the current block. Furthermore, the primary inverse transformer 3240 may determine the primary inverse transform applied to the current block by using mts_idx that indicates a specific MTS among the constructed MTS candidates.

FIG. 33 illustrates an example of decoding flowchart to which a transform is applied according to an embodiment of the present disclosure. The operations of FIG. 33 may be performed by the inverse transformer 230 of the decoding apparatus 200.

In step S3305, the decoding apparatus 200 determines an input length and an output length of non-separable transform based on a height and a width of the current block. Here, each of a width and a height of a block corresponds to 8, an input length of the non-separable transform may be determined as 8, and an output length may be determined as a value which is greater than the input length and smaller than or equal to 64 (e.g., 48 or 64). For example, in the case that the non-separable transform is applied for all of transform coefficients of a 8×8 block in the encoder side, an output length may be determined to be 64, and in the case that the non-separable transform is applied for a part (e.g., the part excluding bottom-right 4×4 area in a 8×8 block) transform coefficients of 8×8 in the encoder side, an output length may be determined to be 48.

In step S3310, the decoding apparatus 200 determines a non-separable transform matrix that corresponds to the input length and the output length of non-separable transform. For example, in the case that an input length of the non-separable transform is 8 and an output length thereof is 48 or 64 (in the case that a size of current block is 4×4), 48×8 or 64×8 matrix derived from a transform kernel may be determined as non-separable transform, and in the case that an input length of the non-separable transform is 16 and an output length thereof is 48 or 64 (in the case that a size of current block is smaller than 8×8 but not 4×4), 48×16 or 64×16 matrix may be determined as non-separable transform.

According to an embodiment of the present disclosure, the decoding apparatus 200 may determine a non-separable transform set index (e.g., NSST index) based on an intra prediction mode of the current block, determine a non-separable transform kernel corresponding to a non-separable transform index in a non-separable transform set included in the non-separable transform set index, and determine the non-separable transform matrix from the non-separable transform kernel based on the input length and the output length determined in step S3305.

In step S3315, the decoding apparatus 200 applies the non-separable transform matrix determined for the current block to the coefficients as many as the input length (8 or 16) determined for the current block. For example, in the case that an input length of the non-separable transform is 8 and an output length thereof is 48 or 64, 48×8 or 64×8 matrix derived from the transform kernel may be applied to 8 coefficients included in the current block, and in the case that an input length of the non-separable transform is 16 and an output length thereof is 48 or 64, 48×16 or 64×16 matrix derived from the transform kernel may be applied to 16 coefficients in top-left 4×4 area of the current block. Here, the coefficients to which the non-separable transform is applied are coefficients up to a position corresponding to the input length (e.g., 8 or 16) along a path according to the scan orders (e.g., (a), (b) or (c) of FIG. 16) predetermined from a DC position of the current block.

In addition, for the case that each of a width and a height of the current block does not correspond to 8, in the case that a multiplication of the width and the height of the current block is smaller than a threshold value, the decoding apparatus 200 may apply the non-separable transform matrix (48×16 or 64×16) that outputs coefficients transformed as many as the output length (e.g., 48 or 64) with 16 coefficients in top-left 4×4 area of the current block as an input, and in the case that a multiplication of the width and the height of the current block is greater than or equal to the threshold value, the decoding apparatus 200 may apply the non-separable transform matrix (48×32 or 64×32) that outputs coefficients transformed as manay as the output length (e.g., 48 or 64) with 32 coefficients of the current block as an input.

In the case that an output length is 64, 64 transformed data (transformed coefficients) in which the non-separable transform is applied to a 8×8 block by applying the non-separable transform matrix are disposed, and in the case that an output length is 48, 48 transformed data (transformed coefficients) in which the non-separable transform is applied to the remaining area excluding bottom-right 4×4 area in a 8×8 block by applying the non-separable transform matrix are disposed.

FIG. 34 illustrates an example of a block diagram of an apparatus for processing a video signal as an embodiment to which the present disclosure is applied. A video signal processing apparatus 3400 of FIG. 34 may correspond to the encoding apparatus 100 of FIG. 1 or the decoding apparatus 200 of FIG. 2.

The video signal processing apparatus 3400 includes a memory for storing an image signal 3420 and a processor 3410 for processing an image signal with being coupled with the memory.

The processor 3410 according to an embodiment to which the present disclosure may include at least one processing circuit for processing an image signal and process an image signal by executing commands for encoding or decoding. That is, the processor 3410 may encode original image data or decode an encoded image signal by executing the encoding or decoding methods described above.

FIG. 35 illustrates an example video coding system according to an embodiment of the disclosure.

The video coding system may include a source device and a receiving device. The source device may transfer encoded video/image information or data in a file or streaming form to the receiving device via a digital storage medium or network.

The source device may include a video source, an encoding device, and a transmitter. The receiving device may include a receiver, a decoding device, and a renderer. The encoding device may be referred to as a video/image encoding device, and the decoding device may be referred to as a video/image decoding device. The transmitter may be included in the encoding device. The receiver may be included in the decoding device. The renderer may include a display unit, and the display unit may be configured as a separate device or external component.

The video source may obtain a video/image by capturing, synthesizing, or generating the video/image. The video source may include a video/image capturing device and/or a video/image generating device. The video/image capturing device may include, e.g., one or more cameras and a video/image archive including previously captured videos/images. The video/image generating device may include, e.g., a computer, tablet PC, or smartphone, and may (electronically) generate videos/images. For example, a virtual video/image may be generated via, e.g., a computer, in which case a process for generating its related data may replace the video/image capturing process.

The encoding device may encode the input video/image. The encoding device may perform a series of processes, such as prediction, transform, and quantization, for compression and coding efficiency. The encoded data (encoded video/image information) may be output in the form of a bitstream.

The transmitter may transfer the encoded video/image information or data, which has been output in the bitstream form, in a file or streaming form to the receiver of the receiving device via a digital storage medium or network. The digital storage media may include various kinds of storage media, such as USB, SD, CD, DVD, Blu-ray, HDD, or SDD. The transmitter may include an element for generating media files in a predetermined file format and an element for transmission over a broadcast/communications network. The receiver may extract the bitstream and transfer the bitstream to the decoding device.

The decoding device may perform a series of procedures, such as inverse quantization, inverse transform, and prediction, corresponding to the operations of the encoding device, decoding the video/image.

The renderer may render the decoded video/image. The rendered video/image may be displayed on the display unit.

FIG. 36 is a view illustrating a structure of a convent streaming system according to an embodiment of the disclosure.

The content streaming system to which the disclosure is applied may largely include an encoding server, a streaming server, a web server, media storage, a user device, and a multimedia input device.

The encoding server may compress content input from multimedia input devices, such as smartphones, cameras, or camcorders, into digital data, generate a bitstream, and transmit the bitstream to the streaming server. As an example, when the multimedia input devices, such as smartphones, cameras, or camcorders, themselves generate a bitstream, the encoding server may be omitted.

The bitstream may be generated by an encoding or bitstream generation method to which the disclosure is applied, and the streaming server may temporarily store the bitstream while transmitting or receiving the bitstream.

The streaming server may transmit multimedia data to the user device based on a user request through the web server, and the web server plays a role as an agent to notify the user what services are provided. If the user sends a request for a desired service to the web server, the web server transfers the request to the streaming server, and the streaming server transmits multimedia data to the user. The content streaming system may include a separate control server in which case the control server controls commands/responses between the devices in the content streaming system.

The streaming server may receive content from the media storage and/or the encoding server. For example, when content is received from the encoding server, content may be received in real-time. In this case, to seamlessly provide the service, the streaming server may store the bitstream for a predetermined time.

Examples of the user device may include mobile phones, smart phones, laptop computers, digital broadcast terminals, personal digital assistants (PDAs), portable multimedia players (PMPs), navigation devices, slate PCs, tablet PCs, ultrabooks, wearable devices, such as smartwatches, smart glasses, or head mounted displays (HMDs), digital TVs, desktop computers, or digital signage devices.

In the content streaming system, the servers may be distributed servers in which case data received by each server may be distributed and processed.

Furthermore, the processing methods to which the present disclosure is applied may be manufactured in the form of a program executed by a computer and stored in computer-readable recording media. Multimedia data having the data structure according to the present disclosure may also be stored in computer-readable recording media. The computer-readable recording media include all types of storage devices and distributed storage devices in which data readable by a computer is stored. The computer-readable recording media may include a Blueray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

Moreover, embodiments of the present disclosure may be implemented as computer program products according to program code and the program code may be executed in a computer according to embodiment of the present disclosure. The program code may be stored on computer-readable carriers.

As described above, the embodiments of the present disclosure may be implemented and executed on a processor, a microprocessor, a controller or a chip. For example, functional units shown in each figure may be implemented and executed on a computer, a processor, a microprocessor, a controller or a chip.

Furthermore, the decoder and the encoder to which the present disclosure is applied may be included in multimedia broadcast transmission/reception apparatuses, mobile communication terminals, home cinema video systems, digital cinema video systems, monitoring cameras, video conversation apparatuses, real-time communication apparatuses such as video communication, mobile streaming devices, storage media, camcorders, video-on-demand (VoD) service providing apparatuses, over the top video (OTT) video systems, Internet streaming service providing apparatuses, 3D video systems, video phone video systems, medical video systems, etc. and may be used to process video signals or data signals. For example, OTT video systems may include game consoles, Blueray players, Internet access TVs, home theater systems, smartphones, tablet PCs, digital video recorders (DVRs), etc.

Furthermore, the processing methods to which the present disclosure is applied may be manufactured in the form of a program executed by a computer and stored in computer-readable recording media. Multimedia data having the data structure according to the present disclosure may also be stored in computer-readable recording media. The computer-readable recording media include all types of storage devices and distributed storage devices in which data readable by a computer is stored. The computer-readable recording media may include a Blueray disk (BD), a universal serial bus (USB), a ROM, a PROM, an EEPROM, a RAM, a CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

Moreover, embodiments of the present disclosure may be implemented as computer program products according to program code and the program code may be executed in a computer according to embodiment of the present disclosure. The program code may be stored on computer-readable carriers.

Embodiments described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment or included as a new claim by a subsequent amendment after the application is filed.

The implementations of the present disclosure may be achieved by various means, for example, hardware, firmware, software, or a combination thereof. In a hardware configuration, the methods according to the implementations of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

Those skilled in the art will appreciate that the present disclosure may be carried out in other specific ways than those set forth herein without departing from the spirit and essential characteristics of the present disclosure. Accordingly, the above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

INDUSTRIAL APPLICABILITY

Although exemplary aspects of the present disclosure have been described for illustrative purposes, those skilled in the art will appreciate that various modifications, additions and substitutions are possible, without departing from essential characteristics of the disclosure.

The invention claimed is:

1. A method for decoding an image signal by an apparatus, comprising:

determining an input length and an output length of a non-separable transform based on a height and a width of a current block;

determining a non-separable transform matrix related to the input length and the output length of the non-separable transform;

applying the non-separable transform matrix for coefficients of the current block, a number of the coefficients being related to the input length of the non-separable transform; and performing primary inverse transform on the coefficients for which the non-separable transform is applied, wherein the input length and the output length of the non-separable transform are determined separately, wherein a size of the non-separable transform matrix is determined as one of four predefined sizes, based on the height and the width of the current block, wherein the input length of the non-separable transform is determined as 16 and the output length of the non-separable transform is greater than the input length of the non-separable transform, based on that both the height and the width of the current block are greater than 8, wherein the input length of the non-separable transform is determined as 8 and the output length of the non-separable transform is greater than the input length of the non-separable transform, based on that both the height and the width of the current block are equal to 8, and wherein the output length is determined as 48 or 64.

2. A method for encoding an image signal by an apparatus, comprising:

performing primary transform on a current block;

determining an input length and an output length of a non-separable transform based on a height and a width of the current block;

determining a non-separable transform matrix for the current block related to the input length and the output length of the non-separable transform;

applying the non-separable transform matrix for coefficients of the primary transformed current block, a number of the coefficients being related to the input length of the non-separable transform; and encoding non-separable transform index information for the non-separable transform matrix for the current block, wherein the input length and the output length of the non-separable transform are determined separately, wherein a size of the non-separable transform matrix is determined as one of four predefined sizes, based on the height and the width of the current block, wherein the output length of the non-separable transform is determined as 16 and the input length of the non-separable transform is greater than the output length of the non-separable transform, based on that both the height and the width of the current block are greater than 8, wherein the output length of the non-separable transform is determined as 8 and the input length of the non-separable transform is greater than the output length of the non-separable transform, based on that both the height and the width of the current block are equal to 8, wherein the input length is determined as 48 or 64.

3. A method of transmitting a bitstream generated by a method for encoding an image signal by an apparatus, the method for encoding the image signal comprising:

performing primary transform on a current block;

determining an input length and an output length of a non-separable transform based on a height and a width of the current block;

determining a non-separable transform matrix for the current block related to the input length and the output length of the non-separable transform;

applying the non-separable transform matrix for coefficients of the primary transformed current block, a number of the coefficients being related to the input length of the non-separable transform; and encoding non-separable transform index information for the non-separable transform matrix for the current block into the bitstream, wherein the input length and the output length of the non-separable transform are determined separately, wherein a size of the non-separable transform matrix is determined as one of four predefined sizes, based on the height and the width of the current block, wherein the output length of the non-separable transform is determined as 16 and the input length of the non-separable transform is greater than the output length of the non-separable transform, based on that both the height and the width of the current block are greater than 8, wherein the output length of the non-separable transform is determined as 8 and the input length of the non-separable transform is greater than the output length of the non-separable transform, based on that both the height and the width of the current block are equal to 8, and wherein the input length is determined as 48 or 64.

* * * * *